(12) United States Patent
Shintani et al.

(10) Patent No.: US 7,979,473 B2
(45) Date of Patent: Jul. 12, 2011

(54) ASSOCIATION RULE EXTRACTION METHOD AND SYSTEM

(75) Inventors: Takahiko Shintani, Tokyo (JP); Yoshitaka Bito, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 551 days.

(21) Appl. No.: 12/089,284

(22) PCT Filed: Mar. 7, 2006

(86) PCT No.: PCT/JP2006/304354
§ 371 (c)(1),
(2), (4) Date: Apr. 4, 2008

(87) PCT Pub. No.: WO2007/043199
PCT Pub. Date: Apr. 19, 2007

(65) Prior Publication Data
US 2010/0131506 A1    May 27, 2010

(30) Foreign Application Priority Data

Oct. 7, 2005  (JP) ................. 2005-295381

(51) Int. Cl.
*G06F 7/00* (2006.01)
(52) U.S. Cl. ............................................. 707/802
(58) Field of Classification Search .......... 707/737, 707/802, 803, 804
See application file for complete search history.

(56) References Cited

U.S. PATENT DOCUMENTS

| 5,794,209 | A | 8/1998 | Agrawal | |
|---|---|---|---|---|
| 2003/0009467 | A1* | 1/2003 | Perrizo | 707/100 |
| 2003/0208488 | A1* | 11/2003 | Perrizo | 707/6 |

FOREIGN PATENT DOCUMENTS

| JP | 8-287106 | 11/1996 |
|---|---|---|
| JP | 11-250084 | 9/1999 |
| JP | 2002-278761 | 9/2002 |
| JP | 2004-029902 | 1/2004 |
| JP | 2004-213463 | 7/2004 |

OTHER PUBLICATIONS

Arnaud Ragel et al., "Treatment of Missing Values for Association Rules", in proceedings of Pacific-Asia conference on Knowledge discovery and Data Mining, 1998.*
"Performance Evaluations of Load Balancing Algorithms for Mining Generalized Association Rules" by Takahiko Shintani, et al. Jul. 1999.
"Mining Association Rules with Classificatin Hierarchies on a Relational Database Management System" by T. Saeki, et al. Jul. 1998.
"Ascending Frequency Ordered Prefix-tree: Efficient Mining of Frequent Patterns" by Guimei Liu, et al. 2003.
"Treatment of Missing Values for Association Rules" by Arnaud Ragel, et al.

* cited by examiner

Primary Examiner — Hung T Vy
(74) Attorney, Agent, or Firm — Mattingly & Malur, P.C.

(57) ABSTRACT

An association rule is extracted by processing a database partitioned into record units in which the same attribute is missing, from a database including missing values. The association rule is extracted from the database including the missing by means for partitioning a database so that a database including a missing analysis object becomes record blocks in which the same attribute is missing, and means for estimating an upper threshold of a support value in the entire database from local support counts in partitioned databases and thereby limiting records for which the support count is counted.

5 Claims, 22 Drawing Sheets

ASSOCIATION RULE EXTRACTION METHOD AND SYSTEM

TECHNICAL FIELD

The present invention relates to a data analysis method and a data analysis system directed to a database and a data warehouse, and more particularly, to data mining for analyzing records in the database and clarifying association properties among data included in the records.

BACKGROUND ART

In data mining for analyzing vast amounts of data and thereby extracting useful information buried therein, an association rule showing an association (linkage) of the data is known. For example, the data mining of supermarket basket data will be considered. There are multiple items in a supermarket and a customer purchases a combination of some of the items. The combination of the items purchased by the customer is recorded as basket data. In the case of analyzing a large amount of basket data, it is desirable to extract a significant itemset, that is, a pattern which appears in multiple customers who have purchased. This pattern is referred to as "frequent itemset" (large itemset). If an association rule like "a customer who has simultaneously purchased an item A and an item B also often simultaneously purchases an item C and an item D" has been extracted, it is found that there is relevance between sales of the items C and D and sales of the items A and B, which can help in making policies of sales such as arrangement of the items, selection of bargain goods and pricing.

Studies of association rule extraction have been performed in a field of the data mining. For example, there are methods described in Patent Document 1, Patent Document 2 and Non-Patent Document 1. In conventional approaches such as Patent Document 1, Patent Document 2 and Non-Patent Document 1, a combination in which attribute values become true, which becomes equal to or more than a minimum threshold of a support value (minimum support) which has been previously set by a user, has been extracted from a database consisting of a set of records including multiple binary attributes, and from the extracted combination, an association rule which becomes equal to or more than a minimum threshold of a confidence value (minimum confidence) which has been previously set by a user, has been derived. In each record, a pair of an attribute and an attribute value is referred to as "item". The support value is a ratio of records including a combination of items in the entire database. A combination of items beyond the minimum threshold of the support value, which is extracted by these methods, is referred to as "frequent itemset". The association rule is derived from a subset of itemsets included in the frequent itemset. In these conventional arts, an analysis object is an ideal database not including missing values, and a database including the missing values is not considered.

However, the missing values may exist in the database to be analyzed. For example, in the case of gene analysis data in a medical field, there is a locus at which a genotype cannot be analyzed, depending on a state of a specimen, gene sequences around a locus to be analyzed, and a state of an analysis device. The locus at which the genotype cannot be analyzed is different for each patient, and also, loci at which the genotype can be analyzed and loci at which the genotype cannot be analyzed are mixed in each patient. Useful information can be obtained by analyzing gene data and case data at a locus where the genotype has been able to be analyzed, for multiple patients. It is possible to know a relationship between a gene and a drug effect or the like by extracting the association rule from the gene data and the case data as analysis objects. For example, if an association rule like "a patient with a genotype Y at an X-th locus of a gene A develops an allergic reaction to a drug C" has been extracted, examination of a type of the X-th locus of the gene A of the patient can help in determination of whether or not to prescribe the drug C, and it is possible to provide medication appropriate for each patient. If the conventional art has been applied, the support value of the itemset becomes an incorrect value, and a correct association rule cannot be extracted.

Another example will be shown. For example, in the case of the supermarket basket data, individual stores may sell different items. For example, it is possible to know a trend in selling the items within a controlled area by analyzing the basket data in multiple stores within the controlled area. In order to examine relevance between the item A and the item B, only the basket data in stores which sell both the item A and the item B is used. If the basket data in a store which does not sell the item A or the item B has been used in the analysis, an incorrect result is obtained.

With respect to a method of extracting the association rule from the database including the missing values, there is Non-Patent Document 2. In the method of Non-Patent Document 2, an association rule which becomes equal to or more than the minimum threshold of the support value and a minimum threshold of a representativity which have been previously set by the user, has been extracted from a database of a so-called tabular form of column by row, including multiple records having multiple discrete-value attributes. Here, a pair of an attribute and an attribute value is referred to as "item", and a combination of items is referred to as "itemset". The number of records in which the itemset appears, in the database, is referred to as "support count", and a ratio of records including the combination of the items, in records in which the attribute constituting the item is not the missing value, is referred to as "support value". A ratio of the number of records in which the attribute included in the association rule is not the missing value to the number of all records in the database is referred to as "representativity".

A procedure for extracting the association rule in the method of Non-Patent Document 2 will be described. At the first step, records in the database are retrieved, and for each item, the number of records in which the above described item appears is counted and IDs of records in which an attribute constituting the above described item is the missing value are obtained. The number of records in which one item X appears is referred to as "support count", and a list of IDs of records in which an attribute constituting one item X is the missing value, is referred to as "missing record list". When the counting has been completed for all records, the support value of each item is calculated, and an item which becomes equal to or more than the minimum threshold of the support value is retrieved. The item in which the support value becomes equal to or more than the minimum threshold is referred to as "frequent item". Here, the support value of one item X is a quotient of the support count of the item X and a value obtained by subtracting the number of the IDs in the missing record list of the item X from the number of the records in the entire database. At the next step, two frequent items are combined and an itemset consisting of the two items is generated. An itemset with an unknown support count is referred to as "potential itemset". For each potential itemset, a union of IDs in missing record lists of items constituting the potential itemset is a missing record list of the above described potential itemset. Again, the records in the database are retrieved, and the support count is counted for each potential itemset. When the counting has been completed for all records, the support value of each potential itemset is calculated, and a potential itemset in which the support value becomes equal to or more than the minimum threshold is retrieved. The potential itemset in which the support value becomes equal to or more than the minimum threshold is referred to as "frequent itemset". At subsequent steps, in a frequent itemset constituted with k items, steps of combining frequent itemsets having common (k−1) items, generating (k+1) potential itemsets, obtaining the missing record lists, retrieving the records in the database, counting the support count of each potential itemset, calculating the support value, and retrieving the frequent itemset are repeated. When all frequent itemsets have been extracted, for the frequent itemset consisting of k items, an association rule is generated from a sub-itemset of an itemset constituting the above described frequent itemset.

Patent Document 1: JP Patent Publication (Kokai) No. 8-287106 A (1996)

Patent Document 2: U.S. Pat. No. 5,794,209

Non-Patent Document 1: G. Liu, H. Lu, Y. Xu, J. Yu, "Ascending frequency ordered prefix-tree: efficient mining of frequent itemsets", in proceedings of International Conference on Database Systems for Advanced Applications, 2003

Non-Patent Document 2: A. Ragel, B. Cremilleux, "Treatment of missing values for association rules", in proceedings of Pacific-Asia Conference on Knowledge Discovery and Data Mining, 1998

DISCLOSURE OF THE INVENTION

PROBLEMS TO BE SOLVED BY THE INVENTION

As described in the conventional arts, if Patent Documents 1, 2 and Non-Patent Document 1 have been directly used for extracting the association rule from the database including the missing, there is a problem in which the association rule cannot be correctly extracted.

Although the method of Non-Patent Document 2 is the method of extracting the association rule from the database including the missing, the generation of the potential itemset and scanning of the database are repeated, which causes poor processing performance. Furthermore, an association rule which is not included in the frequent item extracted at the first step cannot be extracted. For example, it is assumed that the number of the records in the entire database is 12, the support count of one item X is 4, the missing record list of the item X is {1, 2}, the support count of one item Y is 5, the missing record list of the item Y is {2, 3, 4, 5, 6}, and the minimum threshold of the support value is 0.5. Here, if the support count of an itemset in which the items X and Y are combined is 4, since the missing record list of the above described itemset becomes {1, 2, 3, 4, 5, 6} and the support value becomes 0.67, the itemset becomes the frequent itemset. Therefore, an association rule consisting of the items X and Y has to be extracted. However, since the item X is not the frequent item, an association rule including the item X cannot be extracted by the method of Non-Patent Document 2. In this way, although the analysis object of the method of Non-Patent Document 2 is the database including the missing, the method of Non-Patent Document 2 has a disadvantage in which it is not possible to extract all association rules.

It is a first object of the present invention to provide a method and a system which extract all association rules holding true among non-missing values which exists in a database including the missing.

It is a second object of the present invention to provide a method and a system which extract an association rules by partitioning a database into record units in which the same attribute is a missing value, for the purpose of extracting the association rule, and counting a support count of an itemset for each partitioned database and thereby obtaining a support value in the entire database.

It is a third object of the present invention to provide a method which reduces a processing amount for counting the support count of the itemset searched for extracting the association rules.

MEANS FOR SOLVING THE PROBLEMS

One characteristic of an association rule extraction method according to the present invention is that, from a database consisting of a set of records consisting of two or more attributes and records including zero or more missing values, an association rule satisfying a minimum threshold of a support value, a minimum threshold of a confidence value and a minimum threshold of a representativity which have been specified by a user is extracted by a process of partitioning the database into record units in which the same attribute is the missing value, a process of extracting a local frequent itemset which is an itemset satisfying the minimum threshold of the support value, in partitioned databases, a process of obtaining the support value in the entire database for the local frequent itemset, and a process of deriving the association rule from a frequent itemset in the entire database.

Another characteristic of the present invention is that, in the database partitioned into the record units in which the same attribute is the missing value, an upper threshold of the support value of the local frequent itemset in which the support value and a support count are known in at least one database partition and the support value and the support count are unknown in at least one database partition, in the entire database, is calculated by using the support count of the itemset in the database partition with the known support value and the support count of a sub-itemset of the itemset in the database partition with the unknown support value, and thereby database partitions in which the support count of the above described local frequent itemset is counted are limited.

Another characteristic of the present invention is that association rules are extracted in order from association rules including a specific attribute, and when a process of extracting the association rules including the above described attribute is completed, the above described attribute is excluded from objects of subsequent analyses, and thereby data which is simultaneously required in an analysis process is limited.

In other words, an association rule extraction method according to the present invention is an association rule extraction method of, when a pair of an attribute and an attribute value in a database is an item and a combination of items is an itemset, extracting an association rule holding true among two or more items in which the attribute value is not missing, from a database including records in which the attribute value is missing, characterized by including a first step of partitioning the database, a second step of, for an itemset including a specific attribute, counting a support count of the itemset for each partitioned database, and thereby extracting a local frequent itemset which is an itemset which becomes equal to or more than a minimum threshold of a support value which has been previously set, in partitioned databases, a third step of obtaining the support value of the extracted local frequent itemset in the entire database, a fourth step of deriving the association rule from an extracted frequent itemset, and a fifth step of excluding the attribute for which an association rule extraction process has been completed, from objects of subsequent analyses.

According to this method, all association rules holding true among the non-missing values can be extracted from the database including the missing values.

The attribute value is preferably a discrete value or a value which can be associated with the discrete value.

At the second to fourth steps, the specific attribute may be one or more attributes and may be multiple attributes.

The minimum threshold of the confidence value and the minimum threshold of the representativity may not be specified, and in that case, the minimum threshold of the confidence value and the minimum threshold of the representativity may be processed as 0.

If the item or the attribute included in the extracted association rule has been specified by user input or the like, it is preferable to construct a partitioned database including only the specified item and the specified attribute at the first step.

In all database partitions including an attribute list to which an itemset X belongs, if a local support count of the itemset X is known, a global support value which is the support value of the itemset X in the entire database is calculated by a following formula (1).

[Formula 1]

$$GS(X) = \frac{\sum_{i=1}^{m} LS(X:DB(i))}{\sum_{k=1}^{m} RC(DB(k))} \quad (1)$$

Here, the number of the database partitions including the attribute list to which the itemset X belongs is m (m is an integer equal to or more than 1), the database partitions in which the local support count of the itemset X is known are DB(1), ..., DB(m), the number of records included in a database partition DB(i) is RC(DB(i)), and the local support count of the itemset X in the database partition DB(i) is LS(X:DB(i)).

In the database partitions including the attribute list to which the itemset X belongs, if there is a database partition in which the local support count of the itemset X is unknown, since the local support count of the itemset X does not become a value which is larger than the local support count of any sub-itemset, an upper threshold of the global support value of the itemset X is calculated by a following formula (2).

[Formula 2]

$$U(X) = \frac{\sum_{i=1}^{n} LS(X:DB(i)) + \sum_{j=n+1}^{m} \min\{LS(X':DB(j)) \mid X' \subseteq X\}}{\sum_{k=1}^{m} RC(DB(k))} \quad (2)$$

Here, the number of the database partitions including the attribute list to which the itemset X belongs is m (m is an integer equal to or more than 1), the database partitions in which the local support count of the itemset X is known are DB(1), ..., DB(n) (n is an integer equal to or more than 1), the database partitions in which the local support count of the itemset X is unknown are DB(n+1), DB(m), the number of the records included in the database partition DB(i) is RC(DB(i)), the local support count of the itemset X in the database partition DB(i) is LS(X:DB(i)), and the sub-itemset of the itemset X is X'.

A processing amount for the analysis can be reduced by preventing the counting in the database partition with the unknown local support count, for an itemset in which the calculated upper threshold of the global support value is less than the minimum support specified by the user.

ADVANTAGES OF THE INVENTION

According to the present invention, all association rules which hold true among the non-missing values and satisfy the minimum threshold of the support value which has been previously set can be extracted from the database including the missing values. Moreover, the processing amount for the analysis can be reduced by limiting data required in the analysis by partitioning the database into record blocks in which the same attribute is the missing value, performing the process for each partitioned database, limiting to the itemset including the specific attribute and extracting the association rule, and excluding data related to the attribute for which the process has been completed, from the objects of the subsequent analyses; by processing only the itemset which locally satisfies the minimum threshold of the support value in the partitioned database; and by limiting records to be counted, by estimating the upper threshold of the support value in the entire database from the local support value in each partitioned database.

DESCRIPTION OF SYMBOLS

Figure 1:
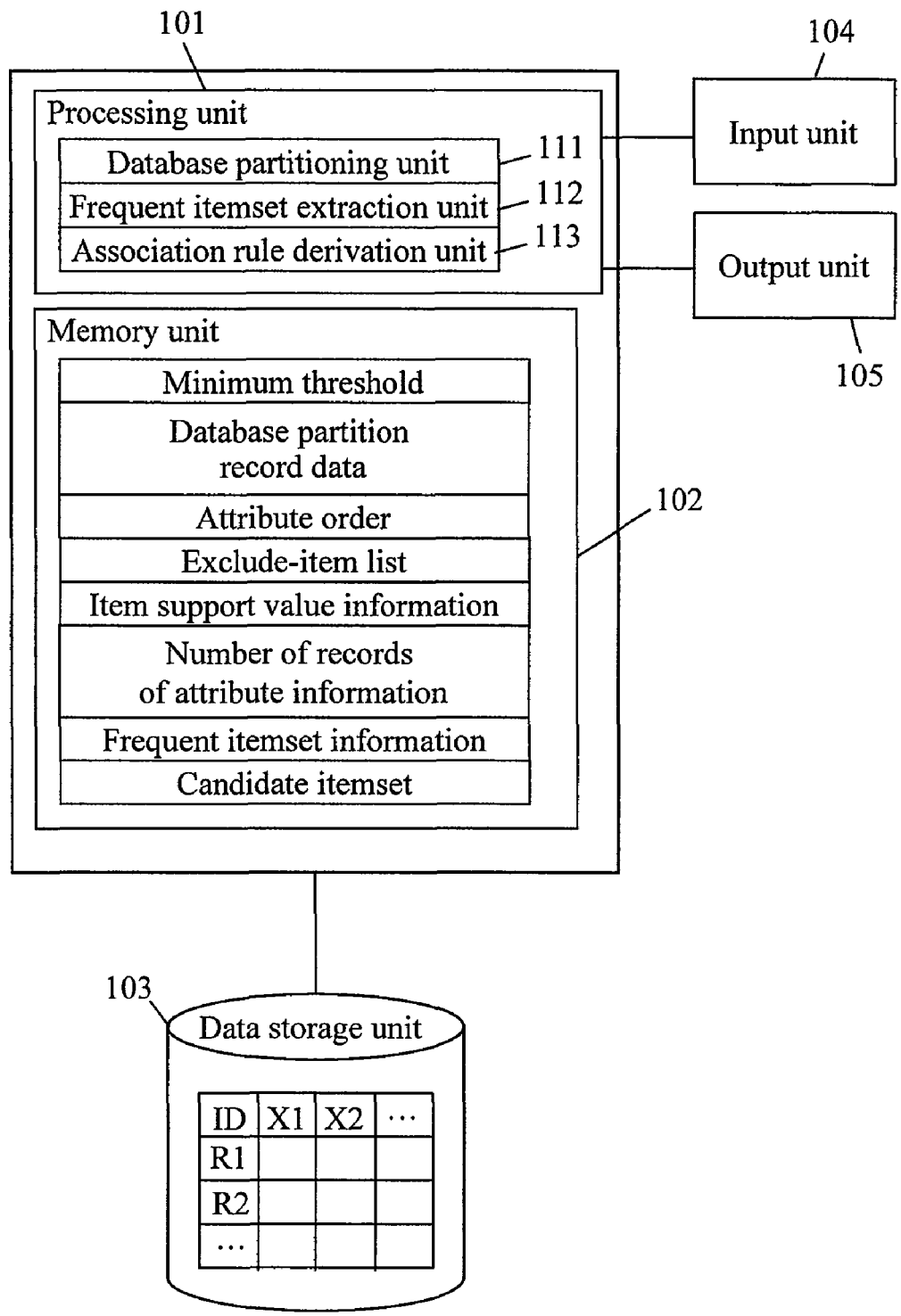
FIG. 1 is a diagram showing a system configuration example of a first embodiment of the present invention.

101 Processing unit
102 Memory unit
103 Data storage unit
104 Input unit
105 Output unit
901 Memory unit
1301 Memory unit
2101 Processing device
2102 Memory device
2103 Data storage device
2104 Input device
2105 Output device
2106 Communication channel
2201 Processing device
2203 Data storage device
2303 Data storage device

BEST MODE FOR CARRYING OUT THE INVENTION

Hereinafter, embodiments of the present invention will be described with reference to the drawings. In the following figures, equivalent functional portions are attached with the same number and a duplicated description thereof will be omitted.

First, terms used in this embodiment will be defined.

A database has a tabular form constituted with attributes consisting of attribute values which are discrete values or can be associated with the discrete values. If the attribute value is missing (empty, NULL), it is referred to as "missing value". Moreover, a pair of an attribute and an attribute value is referred to as "item", which is represented as "attribute:attribute value". If one item X is constituted with an attribute value B of an attribute A, the item X is represented as {A:B}, which represents that the item X belongs to the attribute A. Here, if the attribute values are continuous values, the continuous values can be associated with the discrete values by partitioning the attribute values by range partitioning or the like and assigning a specific discrete value to each partition. Moreover, the continuous values can also be associated with the discrete values which are not included in the attribute values by classifying the discrete values into groups and associating each classification with a specific discrete value.

The database is a set of records which are lists of items, and one ID is assigned to one record. A database to be analyzed consists of a set of records in which the attribute value is missing for one or more attributes.

A combination of items is referred to as "itemset", and if items constituting one itemset X are a subset of one record, it is represented that the above described record includes the itemset X. When a list of attributes to which the items included in one itemset X belong is an attribute list Y, it is represented that the itemset X belongs to the attribute list Y. For example, when an itemset Z is constituted with an attribute A and an attribute value A1, as well as an attribute B and an attribute value B1, the itemset Z is represented as {A:A1, B:B1}, and the itemset Z belongs to an attribute list {A, B}.

With respect to a combination of attributes, in the records in the database to be analyzed, a set of records in which the above described attributes are not the missing value and all other attributes are the missing values is referred to as "database partition". For example, in records included in a database partition related to the attribute A and the attribute B, there is no missing value in the attribute values of the attributes A and B, and all attributes other than the attributes A and B are the missing values. The database partition related to the attributes A and B is represented as "the database partition of the attribute list {A, B}" or "the database partition {A, B}".

In the records in the entire database, the number of records including the itemset X is referred to as "global support count", and a ratio of the global support count to the number of records in which all attributes to which the items included in the above described itemset belong are not the missing values is referred to as "global support value". In the records in one database partition, the number of the records including the itemset X is referred to as "local support count", and a ratio of the local support count to the number of the records in which all attributes to which the items included in the above described itemset belong are not the missing values is referred to as "local support value". Here, "support count" refers to the global support count and the local support count, and "support value" refers to the global support value and the local support value. Since the global support value and the local support value can be calculated from the global support count and the local support count, respectively, the global support value and the global support count, as well as the local support value and the local support count can be similarly handled. Moreover, if an itemset Y includes all items included in one itemset X, it is represented that the itemset Y includes the itemset X, and the itemset X is referred to as "sub-itemset of the itemset Y", and the itemset Y is referred to as "upper itemset of the itemset X". Moreover, if the global support value of one itemset becomes equal to or more than a minimum threshold of the support value which has been previously specified, the above described itemset is referred to as "global frequent itemset". Furthermore, if the local support value of one itemset becomes equal to or more than the minimum threshold of the support value which has been previously specified, the above described itemset is referred to as "local frequent itemset".

An association rule is represented as "X⇒Y", X and Y are the itemsets, and a common item is not included in X and Y. X is referred to as "antecedent" and Y is referred to as "consequent". Generally, the association rule has evaluation values of the support value and a confidence value. The support value shows applicability of the association rule, and the support value of the association rule X⇒Y becomes the support value of itemsets of a combination of the itemsets X and Y. The confidence value means a ratio in which a record satisfying the antecedent also simultaneously satisfies the consequent (a probability in which when the antecedent of the rule has occurred, the consequent occurs), and the confidence value of the association rule X⇒Y becomes a value obtained by dividing the support value of the itemsets of the combination of the itemsets X and Y by the support value of the itemset X. Furthermore, an association rule extracted from a database including the missing values has an evaluation value of a representativity. The representativity shows a ratio of records used for extracting the association rule. The representativity of the association rule X⇒Y becomes a value obtained by dividing the number of records in which all attributes to which the items included in the itemsets X and Y belong are not the missing values by the number of all records included in the database.

EXAMPLE 1

FIG. 1 is a diagram showing a system configuration example of a first embodiment of the present invention. This system is configured with a processing unit 101, a memory unit 102 and a data storage unit 103. The processing unit and the memory unit consist of a computer, and the database to be analyzed is stored in the data storage unit. The processing unit 101 is provided with a database partitioning unit 111, a frequent itemset extraction unit 112 and an association rule derivation unit 113, and retains minimum thresholds of the support value, the confidence value and the representativity, database partition record data, an attribute order to be described later, an exclude-item list to be described later, item support value information, number of records of attribute information, and frequent itemset information, in the memory unit 102 as data or files. Moreover, an input unit 104 provided with a keyboard, a mouse and the like, and an output unit 105 consisting of a display, a printer and the like are connected to the processing unit 101. Attributes X1, X2, . . . , and records of IDs R1, R2, . . . have been stored in the data storage unit 103.

Figure 2:
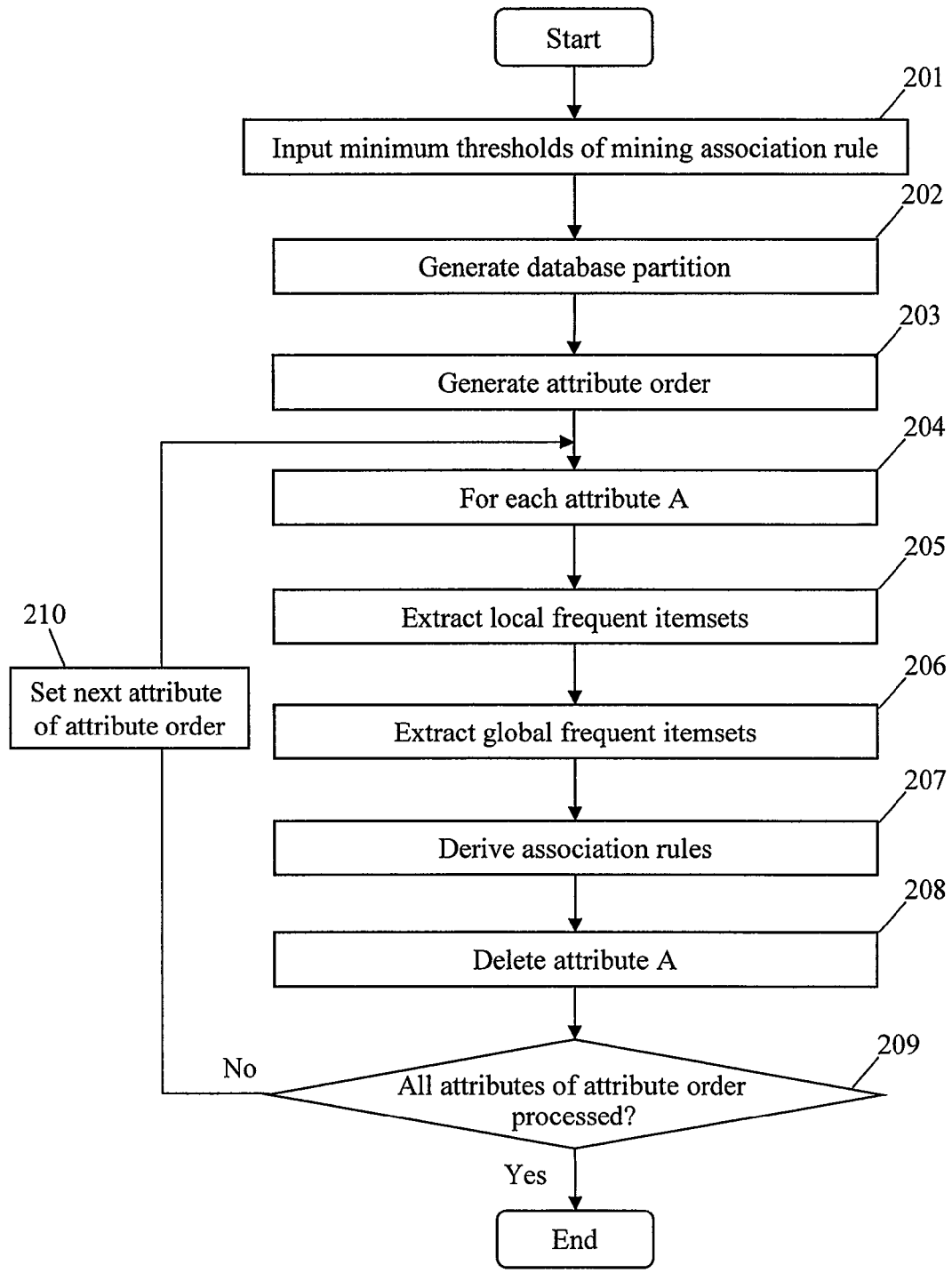
FIG. 2 is a flowchart showing a summary of an association rule extraction process in the present invention.

FIG. 2 is a flowchart describing a procedure for data analysis in detail. First, a user inputs the minimum threshold of the support value, the minimum threshold of the confidence value and the minimum threshold of the representativity of mining an association rule, to the input unit 104. The minimum threshold of the support value is referred to as "minimum support", the minimum threshold of the confidence value is referred to as "minimum confidence", and the minimum threshold of the representativity is referred to as "minimum representativity". The processing unit 101 obtains the minimum support, the minimum confidence and the minimum representativity which have been inputted (201), and stores them in the memory unit 102. Then, the processing unit generates database partitions with respect to data stored in the connected data storage unit 103 (202), and generates the attribute order showing an order of an association rule extraction process to be described later (203). Subsequently, for a specific item to be described later, the local frequent itemset in each database partition is extracted (205), the global frequent itemset is extracted from the extracted local frequent itemset (206), an association rule which satisfies the minimum support, the minimum confidence and the minimum representativity is derived (207), the extracted association rule is outputted to the output unit 105, and the above described attribute is excluded from objects of subsequent analyses (208).

Figure 3:
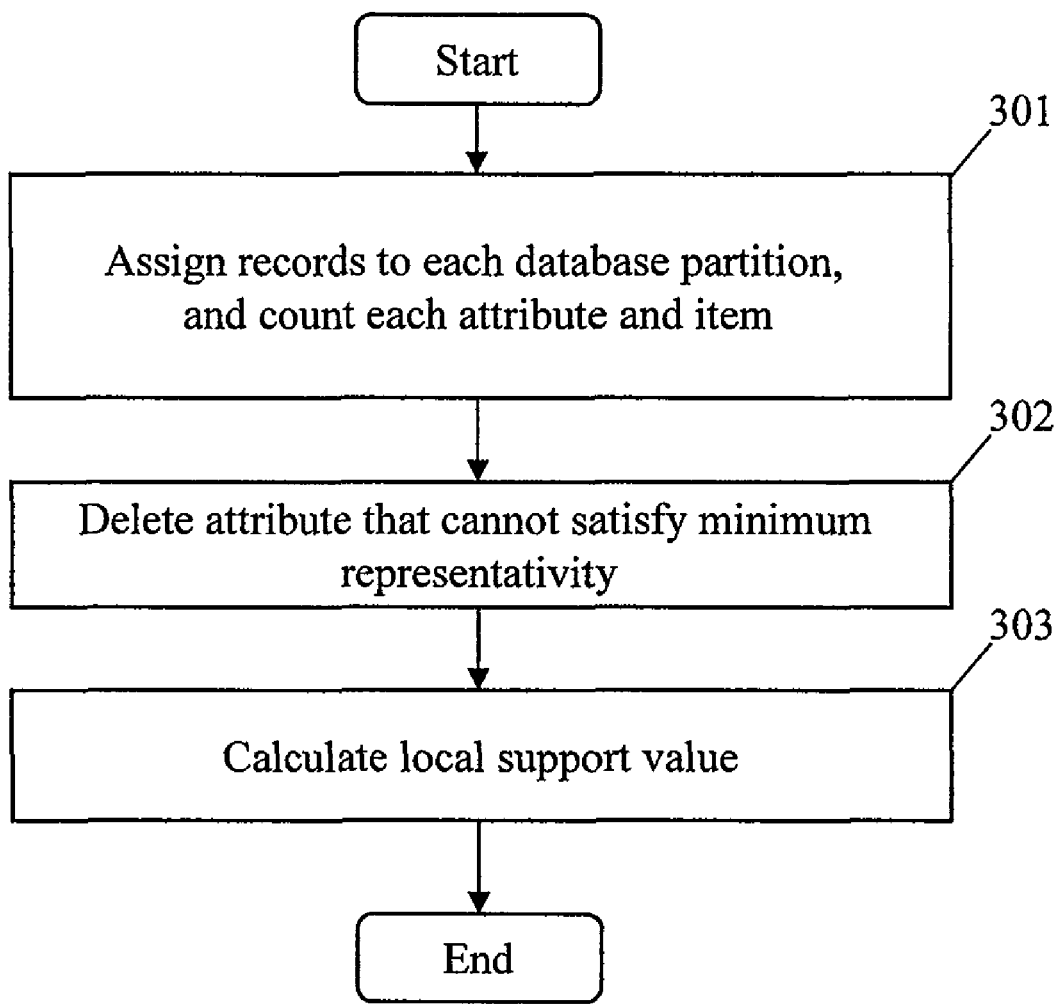
FIG. 3 is a flowchart showing a summary of database partitioning in the present invention.

FIG. 3 is a flowchart describing a procedure for the database partition generation process (202). First, in the memory unit 102, areas for retaining records included in each database partition, the local support count and the local support value of each item in each database partition, the number of records in which each attribute is not the missing value, and the exclude-item list which is a list of items to be excluded from the analysis objects, are prepared and emptied. The database is partitioned into record units in which the same attribute is the missing value, and the database partitions are generated (301), and simultaneously, the number of records with no missing values is counted for each attribute, and for each item, the global support count of the above described item and the local support count of the above described item in each database partition are counted (301). Then, an attribute that cannot satisfy the minimum representativity is detected and deleted from each database partition, and the local support count of each item is updated (302). Furthermore, for each attribute, the local support value of the above described attribute in each database partition is calculated, and also an item which does not simultaneously satisfy the minimum support and the minimum representativity is detected and inserted into the exclude-item list (303).

Figure 4:
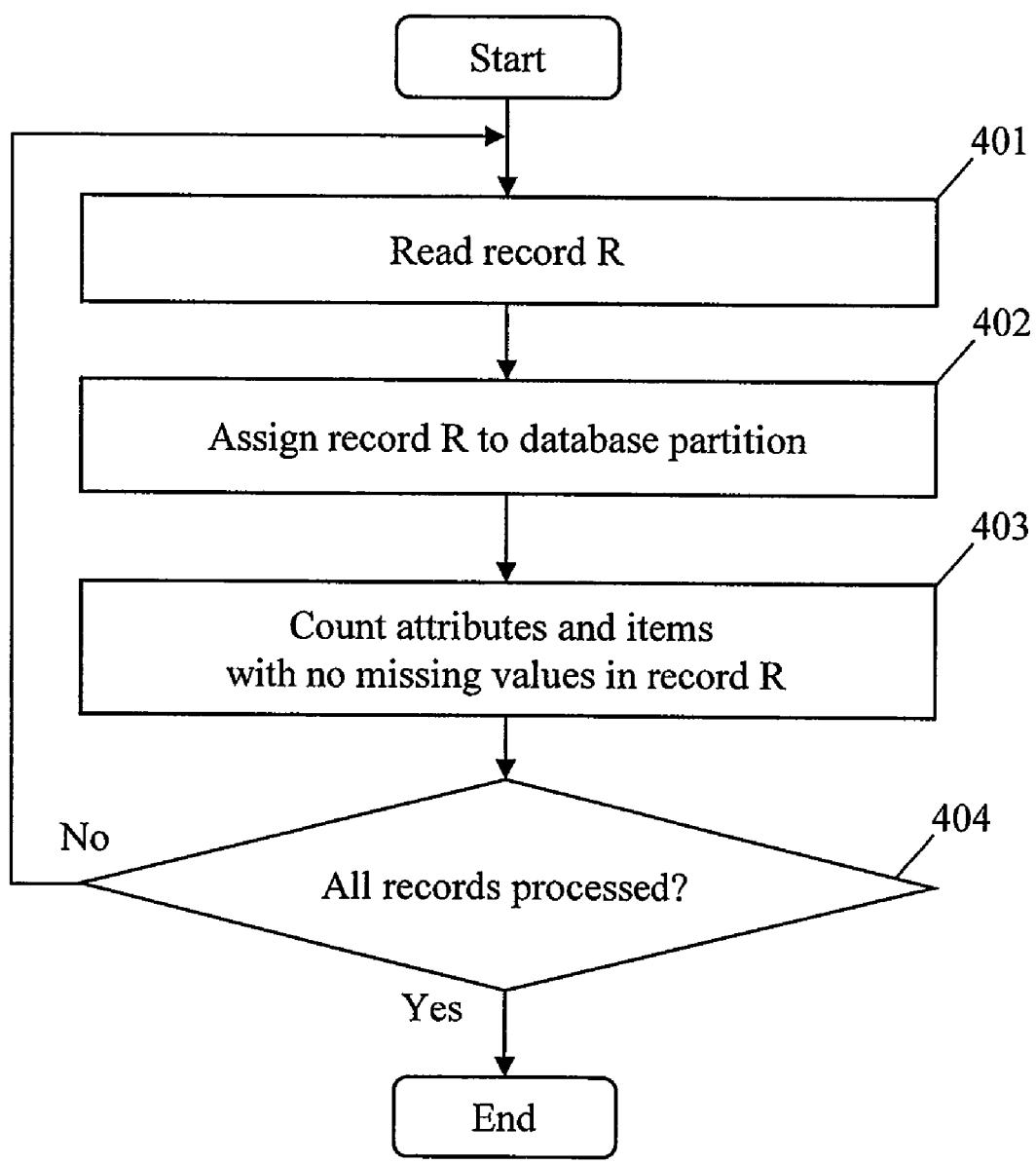
FIG. 4 is a flowchart showing a database partitioning process in the present invention.

FIG. 4 is a flowchart describing a procedure for the process of partitioning the database into the record units in which the same attribute is the missing value (202) in detail. The database is scanned and the record is read (401). For one record R, a list of the attributes with no missing values is retrieved, and the record R is assigned to the database partition of the above described attribute list (402). Furthermore, for the record R, a count of the number of the records of the attribute with no missing value and counts of the global support count and the local support count of the item with no missing value are increased by 1 (403). The above described process is repeated for all records included in the database.

Figure 5:
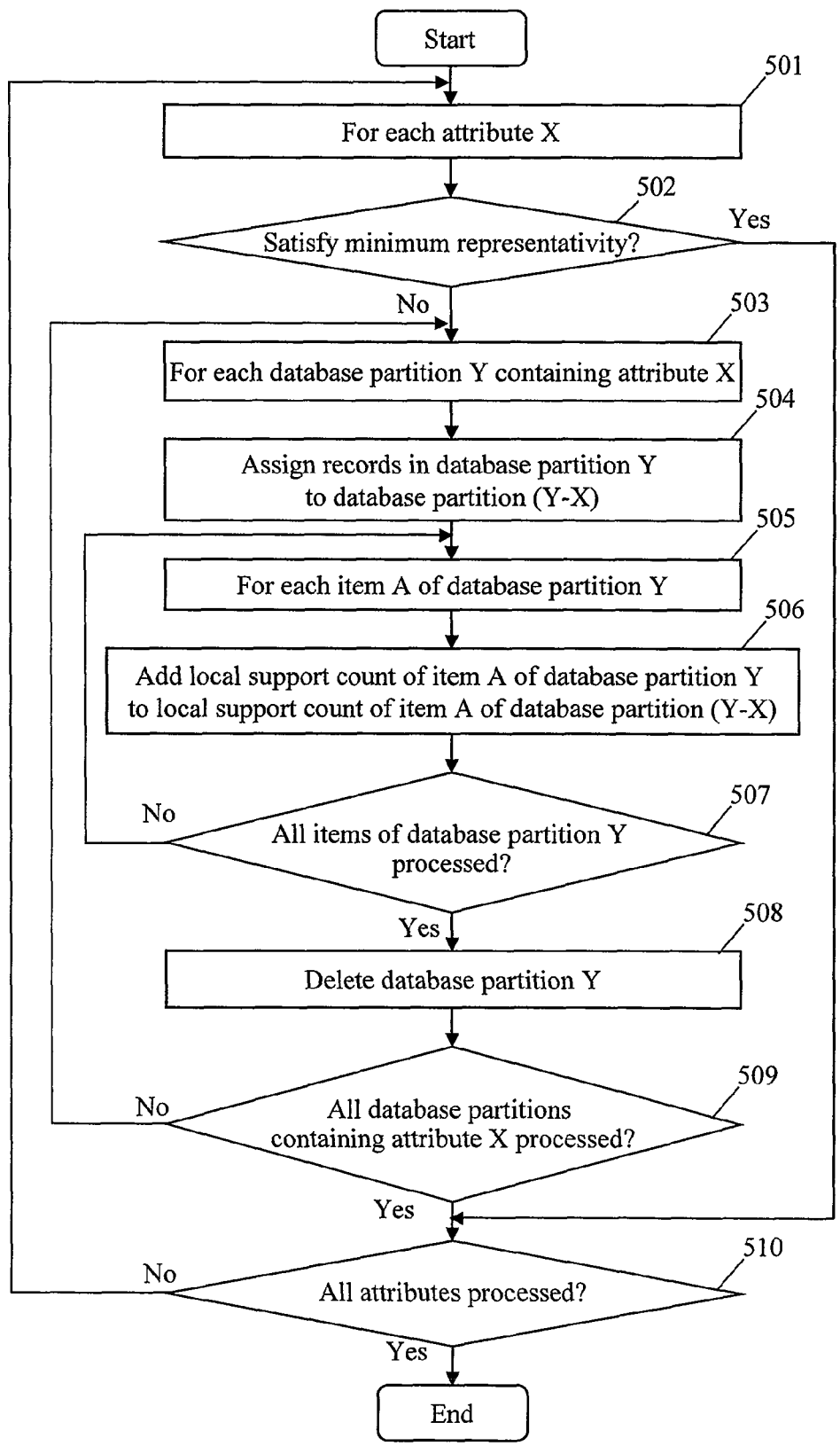
FIG. 5 is a flowchart showing a process of deleting an attribute that cannot satisfy a minimum representativity in the present invention.

Next, the attribute that cannot satisfy the minimum representativity is detected, the above described attribute is deleted from each database partition, and the local support count of each item is updated. FIG. 5 is a flowchart describing a procedure for the process in detail. For each attribute, a value obtained by dividing the number of the records in which the above described attribute is not the missing value by the number of the records in the entire database is calculated, and if this value is less than the minimum representativity, since it is not necessary to extract an association rule including the above described attribute, the above described attribute is excluded from the analysis objects (502). The records included in the database partition including the above described attribute are assigned to a database partition of an attribute list in which the above described attribute has been deleted from the attribute list of the above described database partition (504). Furthermore, the local support count of each item in the database partition including the above described attribute is added to the local support count of the above described item in the database partition of the attribute list in which the above described attribute has been deleted from the attribute list of the above described database partition (505). Finally, the database partition including the above described attribute is deleted (508).

For example, it is assumed that an attribute X cannot satisfy the minimum representativity and an attribute list Y includes the attribute X. First, an attribute list (Y-X) in which the attribute X has been deleted from the attribute list Y is generated, and records included in a database partition of the attribute list Y are assigned to a database partition of the attribute list (Y-X). Next, for an item A belonging to the attribute list Y, if the local support count of the item A in the database partition of the attribute list Y is equal to or more than 1, the above described local support count is added to the local support count of the item A in the database partition of the attribute list (Y-X), and the count of the local support count of the item A in the attribute list Y is deleted. Finally, the database partition of the attribute list Y is deleted.

Figure 6:
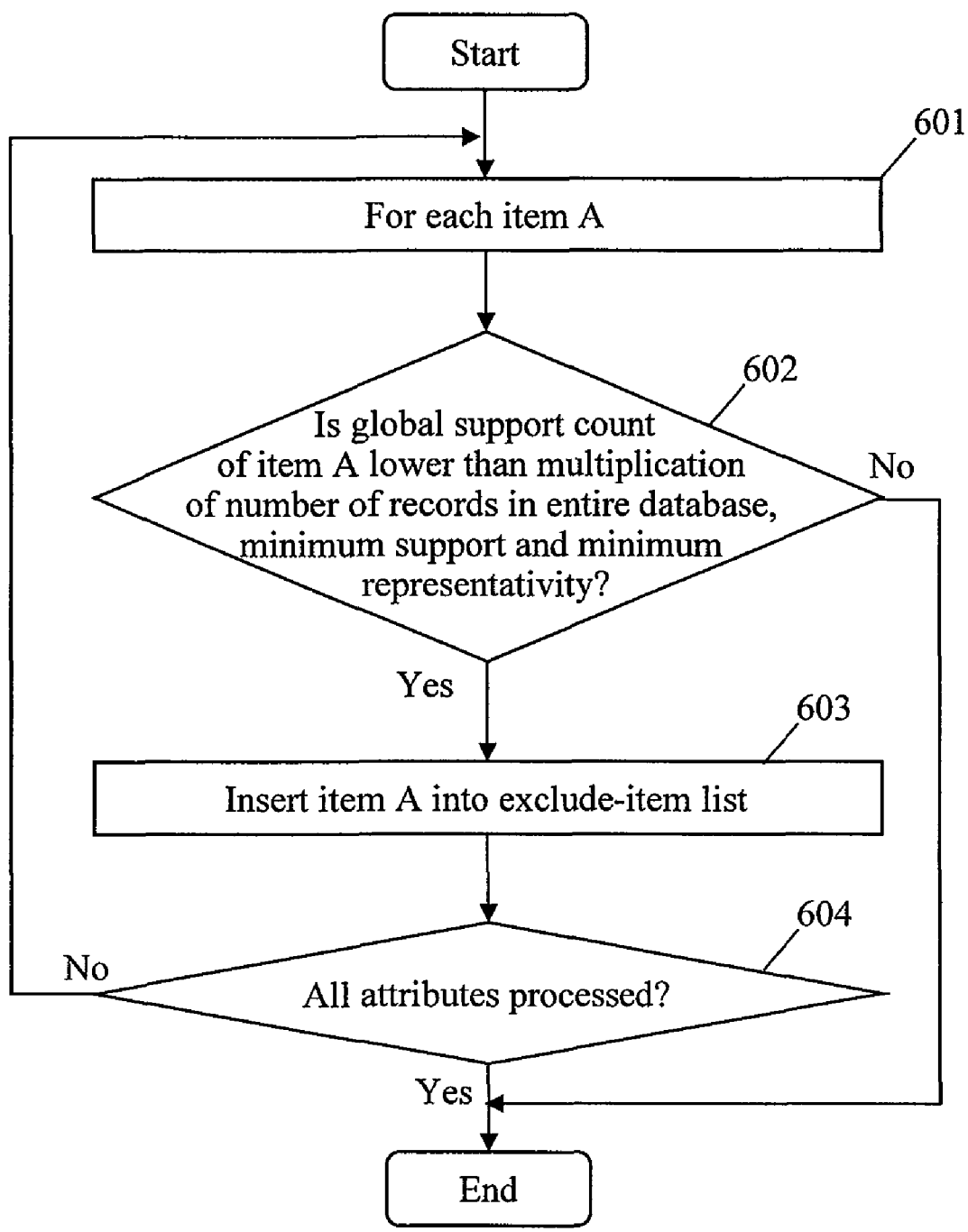
FIG. 6 is a flowchart showing a process of detecting an item which does not simultaneously satisfy a minimum support and the minimum representativity in the present invention.

Next, the item which does not simultaneously satisfy the minimum support and the minimum representativity is extracted, and inserted into the exclude-item list. FIG. 6 is a flowchart describing a procedure for the process. For the item A, when the support count of the above described item is a, the number of the records in the entire database is z, the minimum support is s, and the minimum representativity is r, if a multiplication c of z, s and r is larger than a (c>a) (602), the item A is inserted into the exclude-item list in order to exclude the item A from the analysis objects (603).

Next, for each item, the local support value in each database partition is calculated, and stored in the memory unit 102.

Returning to FIG. 2, attributes included in one or more database partitions are sorted in an arbitrary order to generate the attribute order (203). For example, it is an ascending order of the number of types of database partitions including each attribute. The local frequent itemset extraction process 205, the global frequent itemset extraction process 206 and the association rule derivation process 207 are repeatedly performed for the specific attribute, according to the order of the attributes in this attribute order.

For the specific attribute, the local frequent itemset extraction process 205 counts the local support count of the itemset including the item belonging to the above described attribute, calculates the local support value of the above described itemset, and extracts the local frequent itemset, in all database partitions including the above described attribute. Here, the item for which the local support count of the itemset in each database partition is counted is an item which is not in the exclude-item list and is a local frequent item in the above described database partition. The process of extracting the local frequent itemset in each database partition can be performed by the method of Patent Document 1 or the like.

When all local frequent itemsets have been extracted, for the itemset which becomes locally frequent in one or more database partitions, the global frequent itemset extraction process 206 obtains the global support count of the above described itemset, calculates the global support value, and stores the itemset as the global frequent itemset in the memory unit 102 if the itemset satisfies the minimum support.

For example, for an itemset X, it is assumed that database partitions of an attribute list to which the itemset X belongs are Z0 and Z1, and the itemset X is locally frequent in the database partition Z0. If the itemset X is also locally frequent in the database partition Z1, the global support count of the itemset X becomes a value of a sum of the local support count in the database partition Z0 and the local support count in the database partition Z1. For one itemset X, the global support value of the above described itemset is calculated by Formula (1). If the itemset X is not locally frequent in the database partition Z1 but the local support count in the database partition Z1 is known, since the local support count of the itemset X has been counted in the database partitions of all attribute lists to which the itemset X belongs, the global support count of the itemset X becomes the value of the sum of the local support count in the database partition Z0 and the local support count in the database partition Z1, and the global support value of the itemset X is calculated by Formula (1). If the itemset X is not locally frequent in the database partition Z1 and the local support count in the database partition Z1 is unknown, an upper threshold of the global support value of the itemset X is calculated by Formula (2). An upper threshold of the global support count of the itemset X becomes a value of a sum of the local support count of the itemset X in the database partition Z0 and a minimum threshold of the local support count of a sub-itemset in which the local support count of the itemset X is known in the database partition Z0. If the upper threshold of the above described global support value is equal to or more than the minimum support, the local support count of the itemset X in the database partition Z1 is counted, and the global support value is calculated with a correct global support count of the itemset X by using Formula (1). If the global support value is equal to or more than the minimum support, the itemset X is retained as the global frequent itemset in the memory unit 102.

Figure 7:
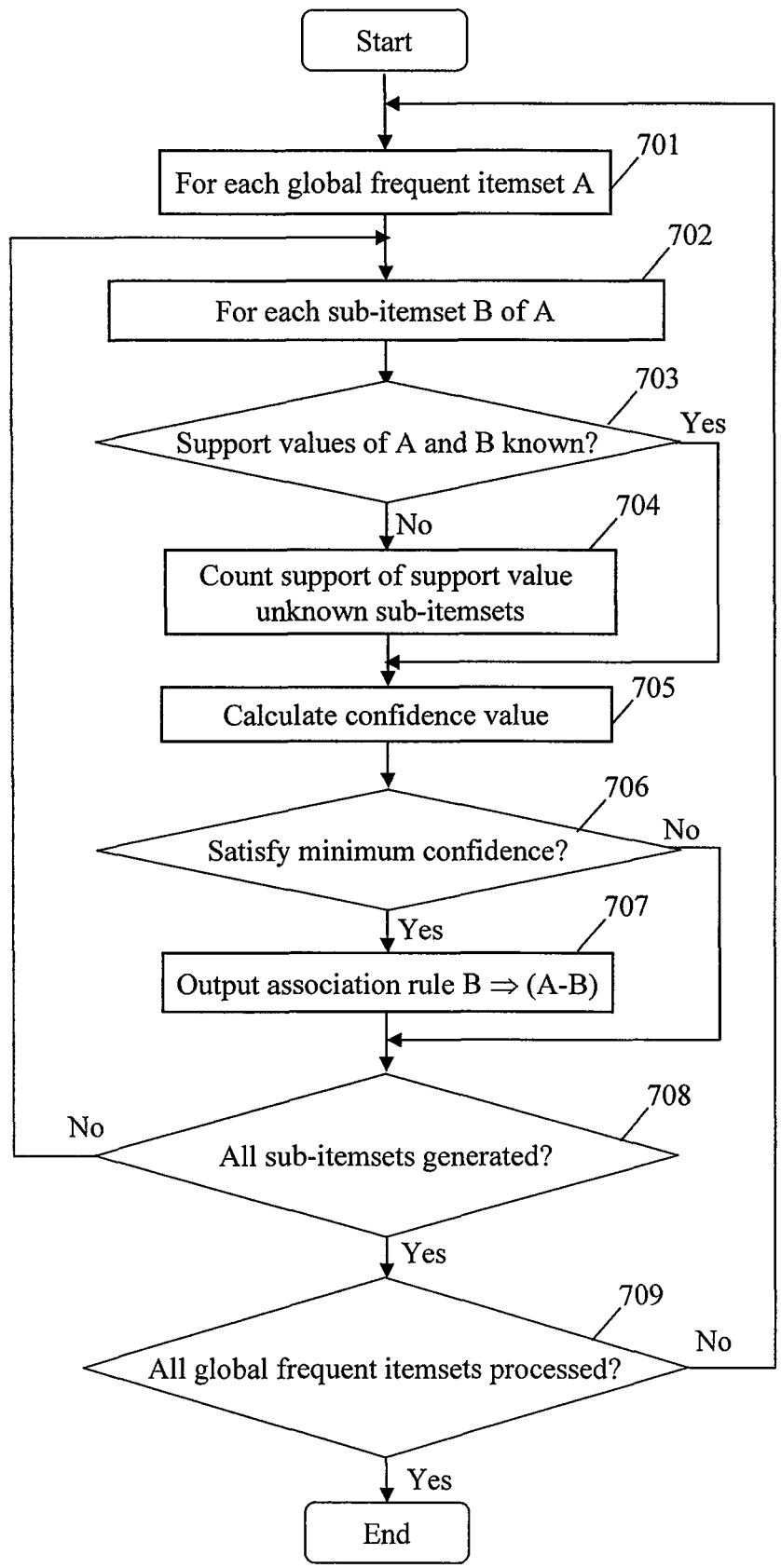
FIG. 7 is a flowchart showing an association rule derivation process in the present invention.

Again returning to FIG. 2, in the association rule derivation process 207, the association rule is derived from the global frequent itemset extracted by the global frequent itemset extraction process 206. FIG. 7 is a flowchart describing the association rule derivation process 207 in detail. For the global frequent itemset X, all sub-itemsets which can be generated from the above described global frequent itemset are generated (702), the above described sub-itemset is set as the antecedent, an itemset which is included in the above described global frequent itemset but is not included in the above described sub-itemset is set to the consequent, and thereby the association rule is derived. The global support count of the above described global frequent itemset becomes the support count of the above described association rule, and the global support value becomes the support value. The confidence value of the above described association rule becomes a value obtained by dividing the support count of the above described global frequent itemset by a summation of the local support count of the itemset of the antecedent of the above described association rule in the database partition to which the itemset of the above described association rule belongs (705). If the local support count of the itemset of the antecedent of the above described association rule in the database partition to which the above described global frequent itemset belongs is unknown (703), the records in the above described database partition are read and the local support count is counted (704). The derived association rule is displayed on the output unit 105 such as the display (707).

Figure 8:
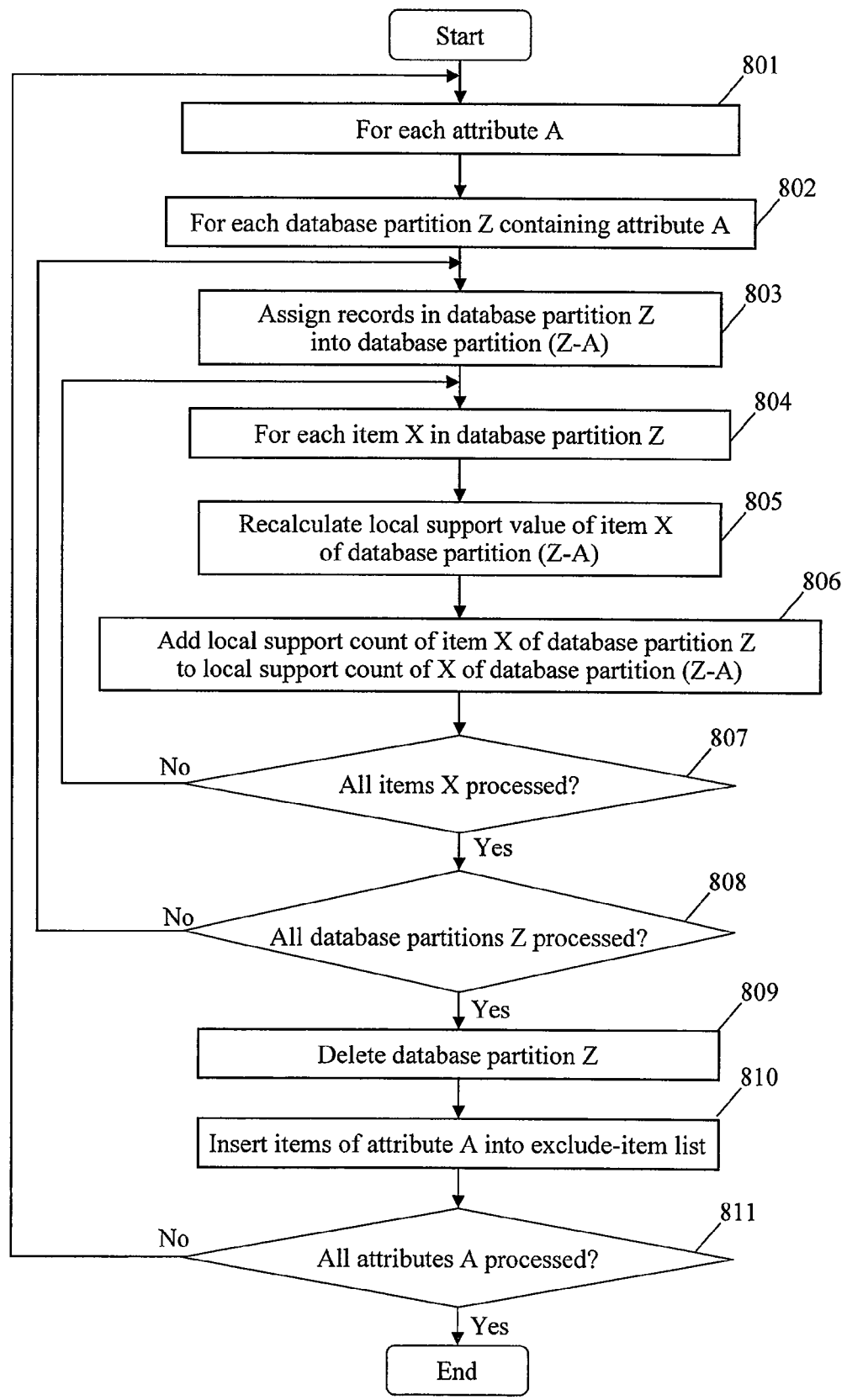
FIG. 8 is a flowchart showing a process of deleting an attribute for which the association rule extraction process has been completed in the present invention.

Next, the attribute for which the association rule derivation process has been completed is deleted by an attribute deletion process. FIG. 8 is a flowchart describing a procedure for the attribute deletion process in detail. For the attribute for which the association rule derivation process has been completed, the above described attribute is deleted from each database partition. The database partition is reconstructed (803), the local support count and the local support value of the item belonging to the above described database partition are updated (805), and the database partition including the above described attribute is deleted (809). Furthermore, the item belonging to the above described item is inserted into the exclude-item list (810). For example, when the attribute for which the association rule derivation process has been completed is A, and an attribute list Z includes the attribute A, an attribute list (Z-A) in which the attribute A has been deleted from the attribute list Z is generated, records included in a database partition of the attribute list Z are assigned to a database partition of the attribute list (Z-A), and the database partition of the attribute list Z is deleted. Furthermore, for each item included in the database partition of the attribute list Z, if the local support count of the above described item in the database partition of the attribute list Z is equal to or more than 1, the above described support count is added to the local support count of the above described item in the database partition of the attribute list (Z-A), and the local support value of the above described item in the database partition of the attribute list (Z-A) is recalculated. Furthermore, the item belonging to the attribute A is inserted into the exclude-item list.

When the local frequent itemset extraction process, the global frequent itemset extraction process and the association rule derivation process have been completed for all attributes, the process is completed.

An analysis method of the present invention has been described above. In this way, in the analysis process, an information amount retained on the memory can be reduced to low by performing the frequent itemset extraction process and the association rule derivation process for each attribute, in the analysis process. Furthermore, a processing load in the analysis can be reduced by searching only the itemset which is locally frequent in at least one database partition, in the process of obtaining the global support value in the frequent itemset extraction process, and if there is the database partition with the unknown local support count, previously detecting the itemset which cannot be the global frequent itemset by calculating the upper threshold of the global support value, and preventing the process of counting the local support count in the database partition with the unknown local support count.

It should be noted that, in this embodiment, although only the local frequent itemset including the item belonging to the specific attribute has been extracted in the local frequent itemset extraction process 205, the process can also be similarly performed by extracting all local frequent itemsets included in each database partition.

Moreover, although the local support count of the itemset including the item belonging to the specific attribute in each database partition has been counted in the local frequent itemset extraction process 205 of this embodiment, it is possible to increase the records for which the process of counting the itemset in the global frequent itemset extraction process 206 is prevented, by simultaneously counting the local support count of a pair of the above described item belonging to the specific attribute and each item.

Furthermore, in this embodiment, although the attribute order generated in the attribute order generation (203) has been the ascending order of the number of the types of the database partitions including each attribute, the order of each attribute in the above described attribute order may be the arbitrary order such as a lexicographic order, random, an ascending order of the number of types of the items of each attribute, or an ascending order of the number of types of global frequent items of each item. A data amount required in the local frequent itemset extraction process (205), the global frequent itemset extraction process (206) and the association rule derivation process (207) varies depending on the order of the attributes in the attribute order. It is desirable to arrange the attributes in the attribute order so that a data amount to be retained in the memory unit is reduced.

EXAMPLE 2

Medical data is taken as an example, and processes performed in the respective processing units will be described.

The database to be analyzed is a set of records consisting of multiple attributes. When the medical data is taken as an example, one record corresponds to one patient, and the respective attributes are information on genes of the patient such as gene sequences, and information on a disease of the patient such as sex, age, a diagnosed disease name and a prescribed drug.

The example of the medical data is shown in Table 1. The example of Table 1 is a medical database consisting of records which consist of five attributes of gene 1, gene 2, disease name of ischemic heart disease, disease name of risk factor and family history of ischemic heart disease, and have a patient ID as an ID. The number of all records is 20.

TABLE 1

Medical Database

| Patient ID | Gene 1 | Gene 2 | Disease name of ischemic heart disease | Disease name of risk factor | Family history of ischemic heart disease |
|---|---|---|---|---|---|
| 1 | CC | AA | Myocardial infarction | Hypertension | Yes |
| 2 |  | AT | Myocardial infarction | Hypertension |  |
| 3 |  | AA | Myocardial infarction | Diabetes mellitus |  |
| 4 |  | AA | Myocardial infarction | None | Yes |
| 5 |  | AA | Myocardial infarction | Diabetes mellitus |  |
| 6 | GG |  |  | Hypertension |  |
| 7 | GG | TT | Angina pectoris | Hypertension | No |
| 8 | CC |  | None | Hypertension |  |
| 9 | CC | AA | None | Hypertension |  |
| 10 |  | TT | Angina pectoris | Hypertension | Yes |
| 11 | GG |  |  | Hypertension |  |
| 12 |  | TT | None | Diabetes mellitus |  |
| 13 | CC |  | None | Hypertension |  |
| 14 | CG | AA | None | Diabetes mellitus | Yes |
| 15 |  |  | None | None |  |
| 16 |  | AA | Myocardial infarction | Diabetes mellitus |  |
| 17 | CG | TT | None | None | No |
| 18 |  | AA | Myocardial infarction | Diabetes mellitus |  |
| 19 |  | TT | Angina pectoris | Hypertension |  |
| 20 | CG | TT | Angina pectoris | Hypertension | Yes |

The case where the minimum threshold of the support value of 0.25, the minimum threshold of the confidence value of 0.75 and the minimum threshold of the representativity of 0.5 have been inputted to the input unit 104 by the user and the medical data is stored in the data storage unit 103 will be considered.

The database partition generation process in the processing unit 101 is shown. In the case of this example, for example, when a record with the patient ID of 2 has been read, the above described record is assigned to a database partition of {gene 2, disease name of ischemic heart disease, disease name of risk factor} which is a list of attributes with no missing values. Furthermore, counts of the number of records of the attributes {gene 2}, {disease name of ischemic heart disease} and {disease name of risk factor} are increased by 1, and for items {gene 2:AT}, {disease name of ischemic heart disease:myocardial infarction} and {disease name of risk factor:hypertension}, counts of the global support count and the support count in the database partition {gene 2, disease name of ischemic heart disease, disease name of risk factor} are increased by 1. When the above described process has been completed for all records, database partitions shown in Table 2 are generated. Moreover, Table 3 shows the number of records in which each attribute is not the missing value, Table 4 shows the global support count of each item, and Table 5 shows the local support count of each item in each database partition.

TABLE 2

Database Partitions

| Patient ID | Gene 1 | Gene 2 | Disease name of ischemic heart disease | Disease name of risk factor | Family history of ischemic heart disease |
|---|---|---|---|---|---|
| 1 | CC | AA | Myocardial infarction | Hypertension | Yes |
| 7 | GG | TT | Angina pectoris | Hypertension | No |
| 14 | CG | AA | None | Diabetes mellitus | Yes |
| 17 | CG | TT | None | None | No |
| 20 | CG | TT | Angina pectoris | Hypertension | Yes |
| 9 | CC | AA | None | Hypertension | |
| 4 | | AA | Myocardial infarction | None | Yes |
| 10 | | TT | Angina pectoris | Hypertension | Yes |
| 2 | | AT | Myocardial infarction | Hypertension | |
| 3 | | AA | Myocardial infarction | Diabetes mellitus | |
| 5 | | AA | Myocardial infarction | Diabetes mellitus | |
| 12 | | TT | None | Diabetes mellitus | |
| 16 | | AA | Myocardial infarction | Diabetes mellitus | |
| 18 | | AA | Myocardial infarction | Diabetes mellitus | |
| 19 | | TT | Angina pectoris | Hypertension | |
| 8 | CC | | None | Hypertension | |
| 13 | CC | | None | Hypertension | |
| 6 | GG | | | Hypertension | |
| 11 | GG | | | Hypertension | |
| 15 | | | None | None | |

TABLE 3

| Attribute | Number of records | Representativity |
|---|---|---|
| Gene 1 | 10 | 0.50 |
| Gene 2 | 15 | 0.75 |
| Disease name of ischemic heart disease | 18 | 0.90 |
| Disease name of risk factor | 20 | 1.00 |
| Family history of ischemic heart disease | 7 | 0.35 |

TABLE 4

| Item | Global support count |
|---|---|
| Gene 1: CC | 4 |
| Gene 1: CG | 3 |

TABLE 4-continued

| Item | Global support count |
|---|---|
| Gene 1: GG | 3 |
| Gene 2: AA | 8 |
| Gene 2: AT | 1 |
| Gene 2: TT | 6 |
| Disease name of ischemic heart disease: angina pectoris | 4 |
| Disease name of ischemic heart disease: myocardial infarction | 7 |
| Disease name of ischemic heart disease: none | 7 |
| Disease name of risk factor: hypertension | 10 |
| Disease name of risk factor: diabetes mellitus | 7 |
| Disease name of risk factor: none | 3 |
| Family history of ischemic heart disease: yes | 5 |
| Family history of ischemic heart disease: no | 2 |

TABLE 5

| Item | Local support count |
|---|---|
| Database partition {gene 1, gene 2, disease name of ischemic heart disease, disease name of risk factor, family history of ischemic heart disease} | |
| Gene 1: CC | 1 |
| Gene 1: CG | 3 |
| Gene 1: GG | 1 |
| Gene 2: AA | 2 |
| Gene 2: TT | 3 |
| Disease name of ischemic heart disease: angina pectoris | 2 |
| Disease name of ischemic heart disease: myocardial infarction | 1 |
| Disease name of ischemic heart disease: none | 2 |
| Disease name of risk factor: hypertension | 3 |
| Disease name of risk factor: diabetes mellitus | 1 |
| Disease name of risk factor: none | 1 |
| Family history of ischemic heart disease: yes | 3 |
| Family history of ischemic heart disease: no | 2 |
| Database partition {gene 1, gene 2, disease name of ischemic heart disease, disease name of risk factor} | |
| Gene 1: CC | 1 |
| Gene 2: AA | 1 |
| Disease name of ischemic heart disease: none | 1 |
| Disease name of risk factor: hypertension | 1 |
| Database partition {gene 2, disease name of ischemic heart disease, disease name of risk factor, family history of ischemic heart disease} | |
| Gene 2: AA | 1 |
| Gene 2: TT | 1 |
| Disease name of ischemic heart disease: angina pectoris | 1 |
| Disease name of ischemic heart disease: myocardial infarction | 1 |
| Disease name of risk factor: hypertension | 1 |
| Disease name of risk factor: none | 1 |
| Family history of ischemic heart disease: yes | 2 |
| Database partition {gene 2, disease name of ischemic heart disease, disease name of risk factor} | |
| Gene 2: AA | 4 |
| Gene 2: AT | 1 |
| Gene 2: TT | 2 |
| Disease name of ischemic heart disease: angina pectoris | 1 |
| Disease name of ischemic heart disease: myocardial infarction | 5 |
| Disease name of ischemic heart disease: none | 1 |
| Disease name of risk factor: hypertension | 2 |
| Disease name of risk factor: diabetes mellitus | 5 |
| Database partition {gene 1, disease name of ischemic heart disease, disease name of risk factor} | |
| Gene 1: CC | 2 |
| Disease name of ischemic heart disease: none | 2 |

TABLE 5-continued

| Item | Local support count |
|---|---|
| Disease name of risk factor: hypertension | 2 |
| Database partition {gene 1, disease name of risk factor} | |
| Gene 1: GG | 2 |
| Disease name of risk factor: hypertension | 2 |
| Database partition {disease name of ischemic heart disease, disease name of risk factor} | |
| Disease name of ischemic heart disease: none | 1 |
| Disease name of risk factor: none | 1 |

Next, the attribute that cannot satisfy the minimum representativity is deleted. In the case of this example, since the number of records in which the attribute {family history of ischemic heart disease} is not the missing value is 7, the representativity of the above described attribute is calculated as 0.35, which cannot satisfy the minimum representativity, and therefore, the above described attribute is deleted from all database partitions. For example, the attribute {family history of ischemic heart disease} is deleted from the records included in a database partition {gene 1, gene 2, disease name of ischemic heart disease, disease name of risk factor, family history of ischemic heart disease} and assigned to a database partition {gene 1, gene 2, disease name of ischemic heart disease, disease name of risk factor}. Furthermore, the local support count of each item included in the database partition {gene 1, gene 2, disease name of ischemic heart disease, disease name of risk factor, family history of ischemic heart disease} is added to the database partition {gene 1, gene 2, disease name of ischemic heart disease, disease name of risk factor}. For example, the local support count of an item {gene 2:AA} in the database partition {gene 1, gene 2, disease name of ischemic heart disease, disease name of risk factor, family history of ischemic heart disease} is added to the database partition {gene 1, gene 2, disease name of ischemic heart disease, disease name of risk factor}, and the local support count of the item {gene 2:AA} in the database partition {gene 1, gene 2, disease name of ischemic heart disease, disease name of risk factor} becomes 3. Moreover, another database partition {gene 2, disease name of ischemic heart disease, disease name of risk factor, family history of ischemic heart disease} including the attribute {family history of ischemic heart disease} is also similarly processed, and thereby the database partitions become as shown in Table 6, and the local support count of each attribute in each database partition becomes as shown in Table 7.

TABLE 6

Database partition {gene 1, gene 2, disease name of ischemic heart disease, disease name of risk factor}

| Patient ID | Gene 1 | Gene 2 | Disease name of ischemic heart disease | Disease name of risk factor |
|---|---|---|---|---|
| 1 | CC | AA | Myocardial infarction | Hypertension |
| 7 | GG | TT | Angina pectoris | Hypertension |
| 9 | CC | AA | None | Hypertension |
| 14 | CG | AA | None | Diabetes mellitus |
| 17 | CG | TT | None | None |
| 20 | CG | TT | Angina pectoris | Hypertension |

Database partition {gene 2, disease name of ischemic heart disease, disease name of risk factor}

| Patient ID | Gene 2 | Disease name of ischemic heart disease | Disease name of risk factor |
|---|---|---|---|
| 2 | AT | Myocardial infarction | Hypertension |
| 3 | AA | Myocardial infarction | Diabetes mellitus |
| 4 | AA | Myocardial infarction | None |
| 5 | AA | Myocardial infarction | Diabetes mellitus |
| 10 | TT | Angina pectoris | Hypertension |
| 12 | TT | None | Diabetes mellitus |
| 16 | AA | Myocardial infarction | Diabetes mellitus |
| 18 | AA | Myocardial infarction | Diabetes mellitus |
| 19 | TT | Angina pectoris | Hypertension |

Database partition {gene 1, disease name of ischemic heart disease, disease name of risk factor}

| Patient ID | Gene 1 | Disease name of ischemic heart disease | Disease name of risk factor |
|---|---|---|---|
| 8 | CC | None | Hypertension |
| 13 | CC | None | Hypertension |

Database partition {gene 1, disease name of risk factor}

| Patient ID | Gene 1 | Disease name of risk factor |
|---|---|---|
| 6 | GG | Hypertension |
| 11 | GG | Hypertension |

Database partition {disease name of ischemic heart disease, disease name of risk factor}

| Patient ID | Disease name of ischemic heart disease | Disease name of risk factor |
|---|---|---|
| 15 | None | None |

TABLE 7

| Item | Local support count | Local support value |
|---|---|---|
| Database partition {gene 1, gene 2, disease name of ischemic heart disease, disease name of risk factor} | | |
| Gene 1: CC | 2 | 0.33 |
| Gene 1: CG | 3 | 0.50 |
| Gene 1: GG | 1 | 0.17 |
| Gene 2: AA | 3 | 0.50 |
| Gene 2: AT | 0 | 0 |
| Gene 2: TT | 3 | 0.50 |
| Disease name of ischemic heart disease: angina pectoris | 2 | 0.33 |
| Disease name of ischemic heart disease: myocardial infarction | 1 | 0.17 |
| Disease name of ischemic heart disease: none | 3 | 0.50 |
| Disease name of risk factor: hypertension | 4 | 0.67 |
| Disease name of risk factor: diabetes mellitus | 1 | 0.17 |
| Disease name of risk factor: none | 1 | 0.17 |
| Database partition {gene 2, disease name of ischemic heart disease, disease name of risk factor} | | |
| Gene 2: AA | 5 | 0.56 |
| Gene 2: AT | 1 | 0.11 |
| Gene 2: TT | 3 | 0.33 |
| Disease name of ischemic heart disease: angina pectoris | 2 | 0.22 |
| Disease name of ischemic heart disease: myocardial infarction | 6 | 0.67 |
| Disease name of ischemic heart disease: none | 1 | 0.11 |
| Disease name of risk factor: hypertension | 3 | 0.33 |
| Disease name of risk factor: diabetes mellitus | 5 | 0.56 |
| Disease name of risk factor: none | 1 | 0.11 |

TABLE 7-continued

| Item | Local support count | Local support value |
|---|---|---|
| Database partition {gene 1, disease name of ischemic heart disease, disease name of risk factor} | | |
| Gene 1: CC | 2 | 0.33 |
| Disease name of ischemic heart disease: none | 2 | 0.33 |
| Disease name of risk factor: hypertension | 2 | 0.33 |
| Database partition {gene 1, disease name of risk factor} | | |
| Gene 1: GG | 2 | 0.50 |
| Disease name of risk factor: hypertension | 2 | 0.50 |
| Database partition {disease name of ischemic heart disease, disease name of risk factor} | | |
| Disease name of ischemic heart disease: none | 1 | 0.50 |
| Disease name of risk factor: none | 1 | 0.50 |

Next, the item which does not simultaneously satisfy the minimum support and the minimum representativity is extracted, and inserted into the exclude-item list. In this example, since the number of all records in the database is 20, the minimum representativity is 0.5, and the minimum support is 0.25, an item with the global support count less than 3 cannot be the global frequent itemset. For example, for the item {gene 2:AT}, since the support count of the above described item in the entire database is 1 and thereby the above described item can be excluded from the analysis objects, the above described item is inserted into the exclude-item list.

Next, for each item, the local support value in each database partition is calculated and retained in the memory unit. In this example, for example, in the database partition {gene 2, disease name of ischemic heart disease, disease name of risk factor}, since the local support count of the item {gene 2:AA} is 5 and the number of records in the database partition {gene 2, disease name of ischemic heart disease, disease name of risk factor} is 9, the local support value of the item {gene 2:AA} becomes 0.56. Table 7 is generated by similarly performing the calculation for each item in each database partition.

Next, the attributes included in one or more database partitions are sorted in the arbitrary order. In this example, it is the ascending order of the number of the types of the database partitions including each attribute. The attribute order becomes an order of {gene 2, gene 1, disease name of ischemic heart disease, disease name of risk factor}.

Next, the association rule extraction is performed. In this example, first, the association rule extraction is performed for the attribute {gene 2}. For the database partitions including the attribute {gene 2}, the itemset which becomes locally frequent in each database partition is extracted. The database partitions including the attribute {gene 2} are the database partition {gene 1, gene 2, disease name of ischemic heart disease, disease name of risk factor} and the database partition {gene 2, disease name of ischemic heart disease, disease name of risk factor}. For example, with respect to the database partition {gene 1, gene 2, disease name of ischemic heart disease, disease name of risk factor}, for seven items of {gene 1:CC}, {gene 1:CG}, {gene 2:AA}, {gene 2:TT}, {disease name of ischemic heart disease:angina pectoris}, {disease name of ischemic heart disease:none} and {disease name of risk factor:hypertension} which are local frequent items in the above described database partition, itemsets including the item {gene 2:AA} or {gene 2:TT} are generated and the local support counts are counted. In each database partition, the local frequent itemsets shown in Table 8 are extracted.

TABLE 8

| Local frequent itemset | Local support count | Local support value |
|---|---|---|
| Database partition {gene 1, gene 2, disease name of ischemic heart disease, disease name of risk factor} | | |
| {Gene 1: CC, gene 2: AA} | 2 | 0.33 |
| {Gene 2: AA, disease name of risk factor: hypertension} | 2 | 0.33 |
| {Gene 1: CC, gene 2: AA, disease name of risk factor: hypertension} | 2 | 0.33 |
| {Gene 2: AA, disease name of ischemic heart disease: none} | 2 | 0.33 |
| {Gene 1: CC, gene 2: AA, disease name of risk factor: hypertension} | 2 | 0.33 |
| {Gene 1: CG, gene 2: TT} | 2 | 0.33 |
| {Gene 2: TT, disease name of ischemic heart disease: angina pectoris} | 2 | 0.33 |
| {Gene 2: TT, disease name of risk factor: hypertension} | 2 | 0.33 |
| {Gene 2: TT, disease name of ischemic heart disease: angina pectoris, disease name of risk factor: hypertension} | 2 | 0.33 |
| Database partition {gene 2, disease name of ischemic heart disease, disease name of risk factor} | | |
| {Gene 2: AA, disease name of ischemic heart disease: myocardial infarction} | 5 | 0.56 |
| {Gene 2: AA, disease name of ischemic heart disease: myocardial infarction, disease name of risk factor: diabetes mellitus} | 4 | 0.44 |
| {Gene 2: AA, disease name of risk factor: diabetes mellitus} | 4 | 0.44 |

Next, for the local frequent itemset extracted in one or more database partitions, the global support count of the above described itemset is obtained, the global support value is calculated, and if the itemset satisfies the minimum support, the itemset is retained as the global frequent itemset in the memory unit. In this example, since an itemset {gene 2:AA, disease name of ischemic heart disease:none} is locally frequent in the database partition {gene 1, gene 2, disease name of ischemic heart disease, disease name of risk factor} and its local support count is unknown in the database partition {gene 2, disease name of ischemic heart disease, disease name of risk factor}, the upper threshold of the global support value is calculated by Formula (2). Since the local support count of the itemset {gene 2:AA, disease name of ischemic heart disease:none} in the database partition {gene 1, gene 2, disease name of ischemic heart disease, disease name of risk factor} is 2, and sub-itemsets of the itemset {gene 2:AA, disease name of ischemic heart disease:none} in the database partition {gene 2, disease name of ischemic heart disease, disease name of risk factor} are the item {gene 2:AA} with the local support count of 5 and the item {disease name of ischemic heart disease:none} with the local support count of 1, the upper threshold of the global support count of the itemset {gene 2:AA, disease name of ischemic heart disease: none} becomes 3, and the upper threshold of the global support value becomes 0.2. Since the upper threshold of the global support value is less than the minimum support, and thereby the itemset {gene 2:AA, disease name of ischemic heart disease:none} cannot be the global frequent itemset, the process of counting the local support count in the database partition {gene 2, disease name of ischemic heart disease, disease name of risk factor} in which the local support count is unknown is not performed. Moreover, since an itemset {gene 2:AA, disease name of ischemic heart disease:myocardial infarction} is locally frequent in the database partition {gene 1, gene 2, disease name of ischemic heart disease, disease name of risk factor}, and its local support count is unknown in the database partition {gene 2, disease name of ischemic heart disease, disease name of risk factor}, the upper threshold of the global support value is calculated by Formula (2). Since the local support count of the itemset {gene 2:AA, disease name of ischemic heart disease:myocardial infarction} in the database partition {gene 2, disease name of ischemic heart disease, disease name of risk factor} is 5, and sub-itemsets of the itemset {gene 2:AA, disease name of ischemic heart disease:myocardial infarction} in the database partition {gene 1, gene 2, disease name of ischemic heart disease, disease name of risk factor} are the item {gene 2:AA} with the local support count of 3 and the item {disease name of ischemic heart disease:myocardial infarction} with the local support count of 1, the upper threshold of the global support count of the itemset {gene 2:AA, disease name of ischemic heart disease:none} becomes 6, and the upper threshold of the global support value becomes 0.4. Since the upper threshold of the global support value becomes equal to or more than the minimum support, the local support count of the itemset {gene 2:AA, disease name of ischemic heart disease:myocardial infarction} in {gene 1, gene 2, disease name of ischemic heart disease, disease name of risk factor} is counted. The global frequent itemsets obtained by obtaining the global support values for all local frequent itemsets are shown in Table 9.

TABLE 9

| Global frequent itemset | Global support count | Global support value |
|---|---|---|
| {Gene 2: TT, disease name of ischemic heart disease: angina pectoris} | 4 | 0.27 |
| {Gene 2: TT, disease name of ischemic heart disease: angina pectoris, | 4 | 0.27 |

TABLE 9-continued

| Global frequent itemset | Global support count | Global support value |
|---|---|---|
| disease name of risk factor: hypertension} | | |
| {Gene 2: TT, disease name of risk factor: hypertension} | 4 | 0.27 |
| {Gene 2: AA, disease name of ischemic heart disease: myocardial infarction} | 6 | 0.40 |
| {Gene 2: AA, disease name of ischemic heart disease: myocardial infarction, disease name of risk factor: diabetes mellitus} | 4 | 0.27 |
| {Gene 2: AA, disease name of risk factor: diabetes mellitus} | 5 | 0.33 |

Next, the association rule is derived from the extracted global frequent itemset, and outputted to the output unit. In this example, for example, an association rule of {gene 2:AA} ⇒{disease name of ischemic heart disease:myocardial infarction} can be extracted from the itemset {gene 2:AA, disease name of ischemic heart disease:myocardial infarction}. Since the support value of the above described association rule becomes the global support value of the itemset {gene 2:AA, disease name of ischemic heart disease: myocardial infarction}, it is 0.40. The confidence value of the above described association rule becomes 0.75, which is a value obtained by dividing the global support value 0.40 of the itemset {gene 2:AA, disease name of ischemic heart disease:myocardial infarction} by the global support value 0.53 calculated from the local support count in the database partition including the attribute {gene 2} and the attribute {disease name of ischemic heart disease} of the itemset {gene 2:AA, disease name of ischemic heart disease:myocardial infarction} of the antecedent. Since the above described confidence value satisfies the minimum confidence, the above described association rule is outputted to the output unit. Association rules including the attribute {gene 2} among the association rules extracted in this example and outputted to the output unit are shown in Table 10.

TABLE 10

| Association rule | | | Confidence value | Support value | Representativity |
|---|---|---|---|---|---|
| {Gene 2: AA} | ⇒ | {Disease name of ischemic heart disease: myocardial infarction, disease name of risk factor: diabetes mellitus} | 0.50 | 0.27 | 0.75 |
| {Gene 2: AA} | ⇒ | {Disease name of ischemic heart disease: myocardial infarction} | 0.75 | 0.40 | 0.75 |
| {Gene 2: AA, disease name of risk factor: diabetes mellitus} | ⇒ | {Disease name of ischemic heart disease: myocardial infarction} | 0.80 | 0.27 | 0.75 |
| {Disease name of risk factor: diabetes mellitus} | ⇒ | {Gene 2: AA} | 0.83 | 0.33 | 0.75 |
| {Disease name of ischemic heart disease: myocardial infarction} | ⇒ | {Gene 2: AA} | 0.86 | 0.40 | 0.75 |
| {Disease name of ischemic heart disease: myocardial infarction, disease name of risk factor: diabetes mellitus} | ⇒ | {Gene 2: AA} | 1.00 | 0.27 | 0.75 |
| {Gene 2: TT, disease name of ischemic heart disease: angina pectoris} | ⇒ | {Disease name of risk factor: hypertension} | 1.00 | 0.27 | 0.75 |
| {Gene 2: TT, disease name of risk factor: hypertension} | ⇒ | {Disease name of ischemic heart disease: angina pectoris} | 1.00 | 0.27 | 0.75 |
| {Disease name of ischemic heart disease: angina pectoris} | ⇒ | {Gene 2: TT} | 1.00 | 0.27 | 0.75 |
| {Disease name of ischemic heart disease: angina pectoris} | ⇒ | {Gene 2: TT, disease name of risk factor: hypertension} | 1.00 | 0.27 | 0.75 |

TABLE 10-continued

| Association rule | | Confidence value | Support value | Representativity |
|---|---|---|---|---|
| {Disease name of ischemic heart disease: angina pectoris, disease name of risk factor: hypertension} | ⇒ {Gene 2: TT} | 1.00 | 0.27 | 0.75 |
| {Gene 2: AA} | ⇒ {Disease name of ischemic heart disease: myocardial infarction} | 0.75 | 0.40 | 0.75 |
| {Gene 2: AA, disease name of risk factor: diabetes mellitus} | ⇒ {Disease name of ischemic heart disease: myocardial infarction} | 0.80 | 0.27 | 0.75 |
| {Gene 2: TT, disease name of ischemic heart disease: angina pectoris} | ⇒ {Disease name of risk factor: hypertension} | 1.00 | 0.27 | 0.75 |
| {Gene 2: TT, disease name of risk factor: hypertension} | ⇒ {Disease name of ischemic heart disease: angina pectoris} | 1.00 | 0.27 | 0.75 |

Next, the attribute for which the association rule derivation process has been completed is deleted by the attribute deletion process. In this example, the attribute {gene 2} is deleted from each database partition, the database partition is reconstructed, the local support count and the local support value of the item belonging to the above described database partition are updated, and the item belonging to the attribute {gene 2} is inserted into the exclude-item list. For example, each record in the database partition {gene 1, gene 2, disease name of ischemic heart disease, disease name of risk factor} is assigned to a database partition {gene 1, disease name of ischemic heart disease, disease name of risk factor}. Also the local support count of each item included in the database partition {gene 1, gene 2, disease name of ischemic heart disease, disease name of risk factor} is added to the local support count of the above described item in the database partition {gene 1, disease name of ischemic heart disease, disease name of risk factor}, and the local support count is updated. For example, for the item {disease name of risk factor:hypertension}, the local support count 4 in the database partition {gene 1, gene 2, disease name of ischemic heart disease, disease name of risk factor} is added to the local support count 2 in the database partition {gene 1, disease name of ischemic heart disease, disease name of risk factor}, and thereby the local support count is updated to 6 and the local support value is updated to 0.75 in the database partition {gene 1, disease name of ischemic heart disease, disease name of risk factor}. Database partitions generated by repeating the above described process for all database partitions including the attribute {gene 2} and each item included in the above described database partitions are shown in Table 11, and the local support count and the local support value of each item are shown in Table 12.

TABLE 11

Database partition {gene 1, disease name of ischemic heart disease, disease name of risk factor}

| Patient ID | Gene 1 | Disease name of ischemic heart disease | Disease name of risk factor |
|---|---|---|---|
| 8 | CC | None | Hypertension |
| 13 | CC | None | Hypertension |
| 1 | CC | Myocardial infarction | Hypertension |
| 7 | GG | Angina pectoris | Hypertension |
| 9 | CC | None | Hypertension |
| 14 | CG | None | Diabetes mellitus |
| 17 | CG | None | None |
| 20 | CG | Angina pectoris | Hypertension |

TABLE 11-continued

Database partition {gene 1, disease name of risk factor}

| Patient ID | Gene 1 | Disease name of risk factor |
|---|---|---|
| 6 | GG | Hypertension |
| 11 | GG | Hypertension |

Database partition {disease name of ischemic heart disease, disease name of risk factor}

| Patient ID | Disease name of ischemic heart disease | Disease name of risk factor |
|---|---|---|
| 15 | None | None |
| 2 | Myocardial infarction | Hypertension |
| 3 | Myocardial infarction | Diabetes mellitus |
| 4 | Myocardial infarction | None |
| 5 | Myocardial infarction | Diabetes mellitus |
| 10 | Angina pectoris | Hypertension |
| 12 | None | Diabetes mellitus |
| 16 | Myocardial infarction | Diabetes mellitus |
| 18 | Myocardial infarction | Diabetes mellitus |
| 19 | Angina pectoris | Hypertension |

TABLE 12

| Item | Local support count | Local support value |
|---|---|---|
| Database partition {gene 1, disease name of ischemic heart disease, disease name of risk factor} | | |
| Gene 1: CC | 4 | 0.50 |
| Gene 1: CG | 3 | 0.38 |
| Gene 1: GG | 1 | 0.13 |
| Disease name of ischemic heart disease: angina pectoris | 2 | 0.25 |
| Disease name of ischemic heart disease: myocardial infarction | 1 | 0.13 |
| Disease name of ischemic heart disease: none | 5 | 0.63 |
| Disease name of risk factor: hypertension | 6 | 0.75 |
| Disease name of risk factor: diabetes mellitus | 1 | 0.13 |
| Disease name of risk factor: none | 1 | 0.13 |
| Database partition {gene 1, disease name of risk factor} | | |
| Gene 1: GG | 2 | 0.50 |
| Disease name of risk factor: hypertension | 2 | 0.50 |
| Database partition {disease name of ischemic heart disease, disease name of risk factor} | | |
| Disease name of ischemic heart disease: angina pectoris | 2 | 0.20 |
| Disease name of ischemic heart disease: myocardial infarction | 6 | 0.60 |

TABLE 12-continued

| Item | Local support count | Local support value |
|---|---|---|
| Disease name of ischemic heart disease: none | 2 | 0.20 |
| Disease name of risk factor: hypertension | 3 | 0.30 |
| Disease name of risk factor: diabetes mellitus | 5 | 0.50 |
| Disease name of risk factor: none | 2 | 0.20 |

According to the above described process, all association rules including the attribute {gene 2} have been extracted.

Next, all association rules can be extracted by repeating the local frequent itemset extraction process 205, the global frequent itemset extraction process 206 and the association rule derivation process 207, for the second and subsequent attributes in the attribute order in order.

In this example, for example, the processing load in the analysis can be reduced by preventing the process of counting the local support count of the itemset {gene 2:AA, disease name of ischemic heart disease:none} in the database partition {gene 2, disease name of ischemic heart disease, disease name of risk factor}. Moreover, for example, the information retained in the memory unit can be reduced by extracting only the association rule related to the attribute {gene 2}. Furthermore, since the above described attribute is deleted from the database partition when the association rule extraction process for the above described attribute has been completed, and the above described attribute does not exist in the data when the association rules related to other attributes are extracted, the processing load can be reduced.

Moreover, in this example, it is possible to extract an association rule including an item which is not globally and locally frequent as a single item, such as, for example, an association rule including the attribute {disease name of ischemic heart disease:angina pectoris}, that is, {gene 2:TT, disease name of risk factor:hypertension} ⇒ {disease name of ischemic heart disease:angina pectoris}.

EXAMPLE 3

Figure 9:
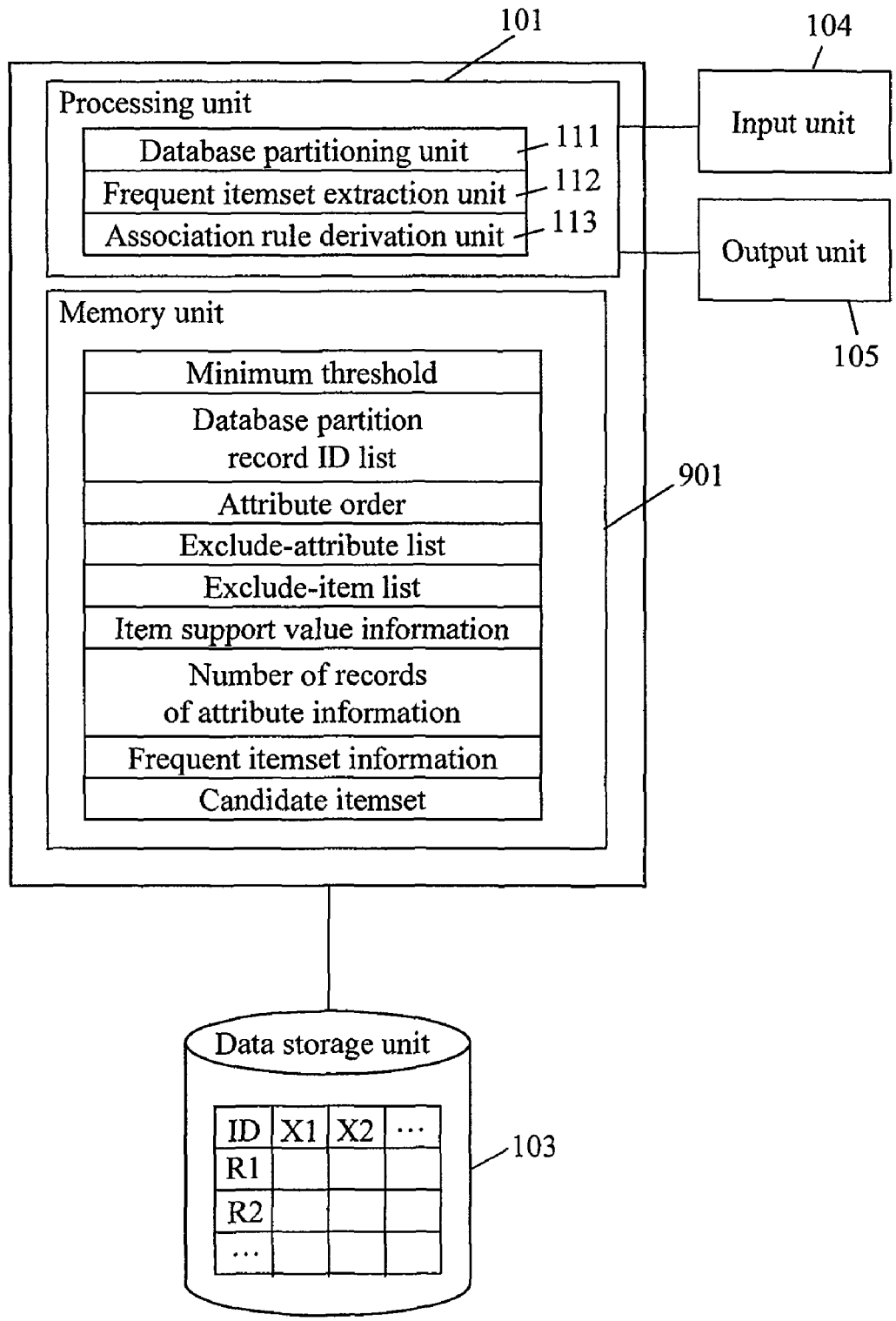
FIG. 9 is a diagram showing a system configuration example of a second embodiment of the present invention.

FIG. 9 is a diagram showing a system configuration example of a second embodiment of the present invention. This system is configured with the processing unit 101, a memory unit 901 and the data storage unit 103. The processing unit and the memory unit consist of a computer, and the database to be analyzed is stored in the data storage unit. The minimum thresholds of the support value, the confidence value and the representativity, a database partition record ID list, the attribute order, an exclude-attribute list to be described later, the exclude-item list, the item support value information, the number of records of attribute information, and the frequent itemset information are retained in the memory unit 901 as the data or the files.

Although the procedure for the data analysis is the same as the embodiment 1, the processes in the database partitioning unit 111 and the association rule derivation unit 113 in the processing unit 101 are different.

Figure 10:
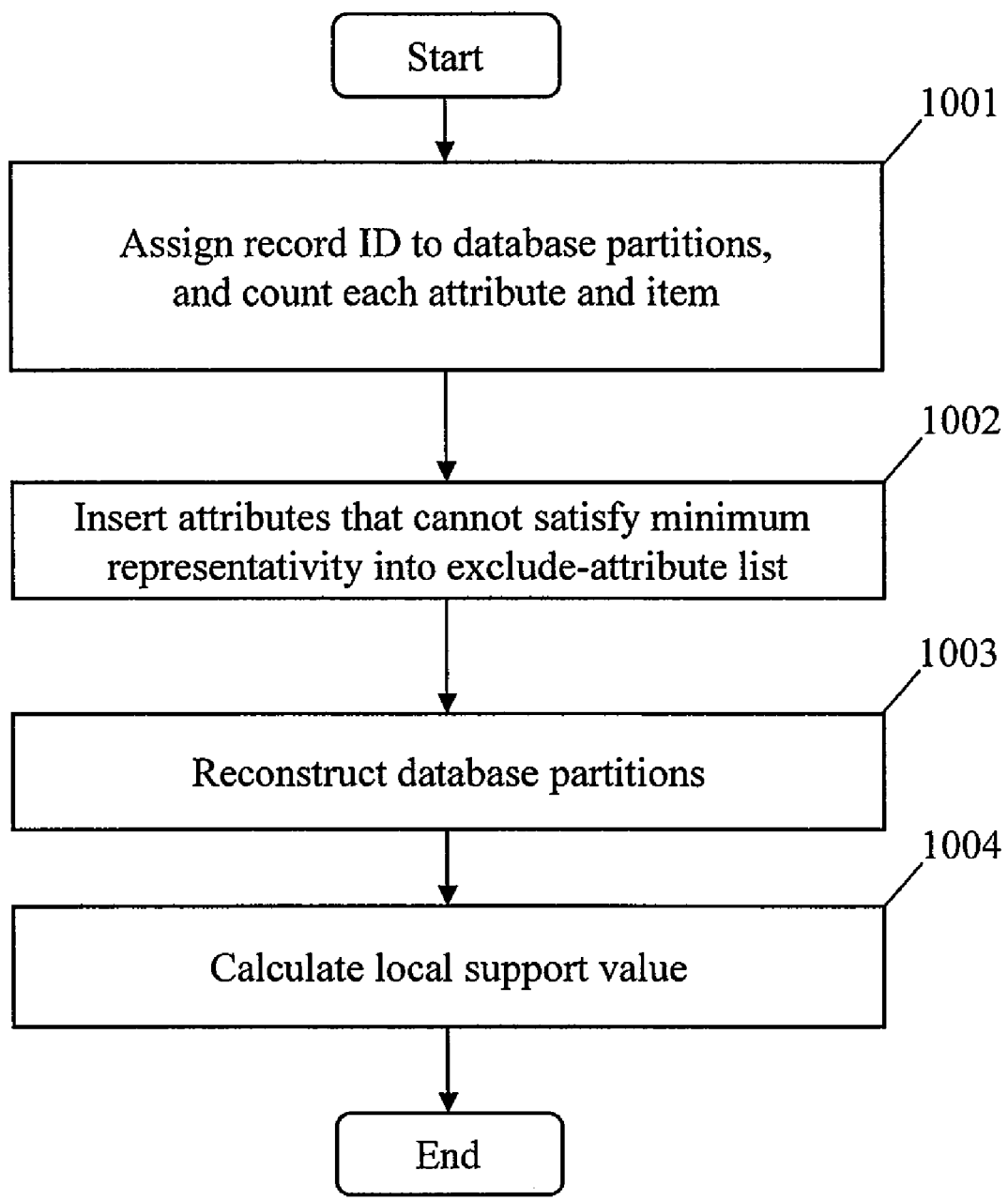
FIG. 10 is a flowchart showing a summary of the database partitioning process in the present invention.

FIG. 10 is a flowchart describing the procedure for the database partition generation process in the second embodiment in detail. First, in the memory unit 901, areas for retaining a list of record IDs included in each database partition, the local support count and the local support value of each item in each database partition, the number of the records in which each attribute is not the missing value, the exclude-attribute list which is a list of attributes to be excluded from the analysis objects, and the exclude-item list which is the list of the items to be excluded from the analysis objects, are prepared and emptied. The database is partitioned into the record units in which the same attribute is the missing value, and the database partitions are generated (1001), and simultaneously, the number of the records with no missing values is counted for each attribute, and for each item, the global support count of the above described item and the local support count of the above described item in each database partition are counted (1001). Then, the attribute that cannot satisfy the minimum representativity is detected and inserted into the exclude-attribute list (1002), each database partition is reconstructed, and the local support count of each item is updated (1003). Furthermore, for each attribute, the local support value of the above described attribute in each database partition is calculated, and also the item which does not simultaneously satisfy the minimum support and the minimum representativity is detected, and inserted into the exclude-item list (1004).

Figure 11:
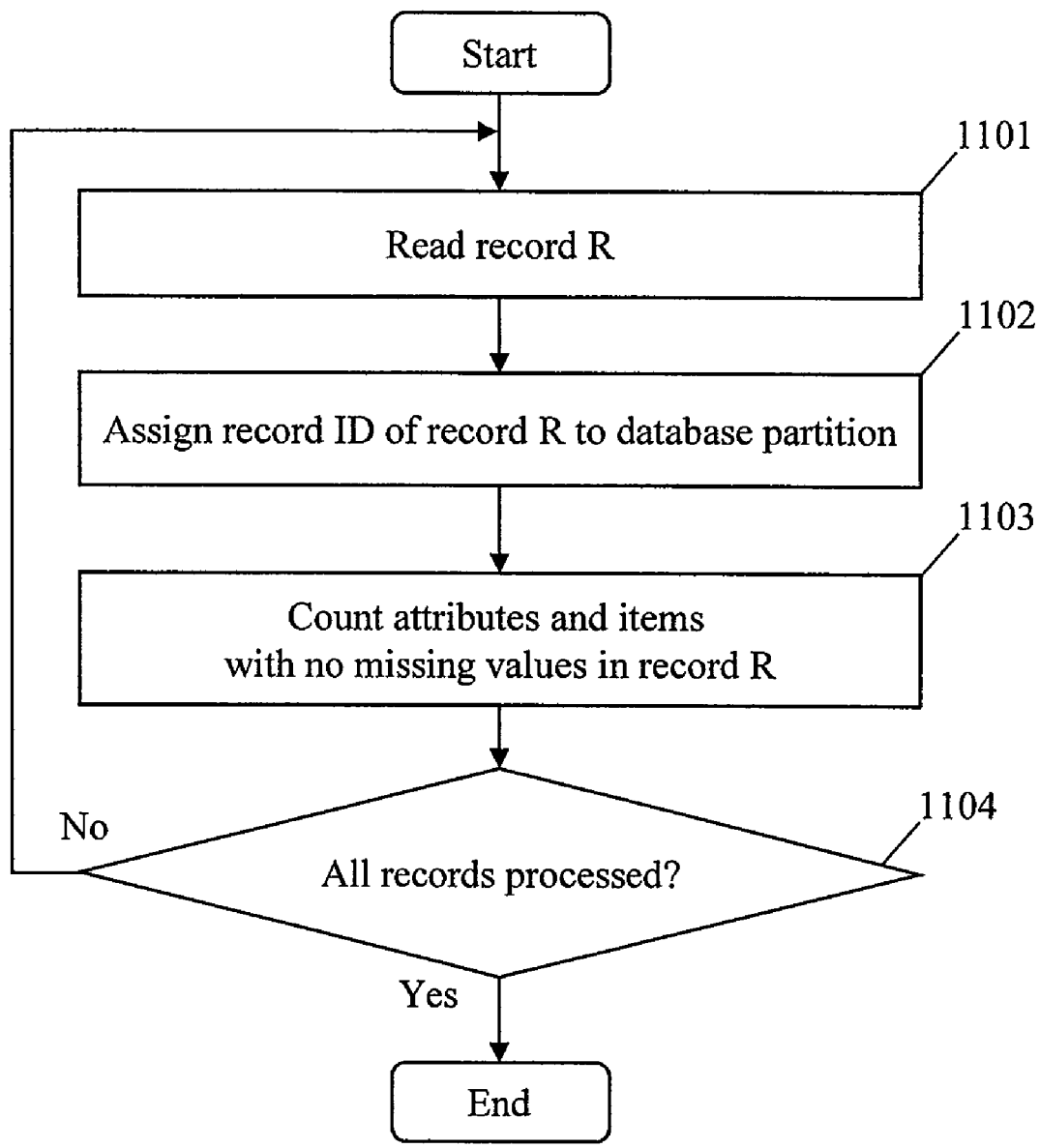
FIG. 11 is a flowchart showing the database partitioning process in the present invention.

FIG. 11 is a flowchart describing the procedure for the process of partitioning the database into the record units in which the same attribute is the missing value in detail. The database is scanned and the record is read (1101). For one record R, the list of the attributes with no missing values is retrieved, and the ID of the record R is assigned to the database partition of the above described attribute list (1102). Furthermore, for the record R, the count of the number of the records of the attribute with no missing value and the counts of the global support count and the local support count of the item with no missing value are increased by 1 (1103). The above described process is repeated for all records included in the database.

Figure 12:
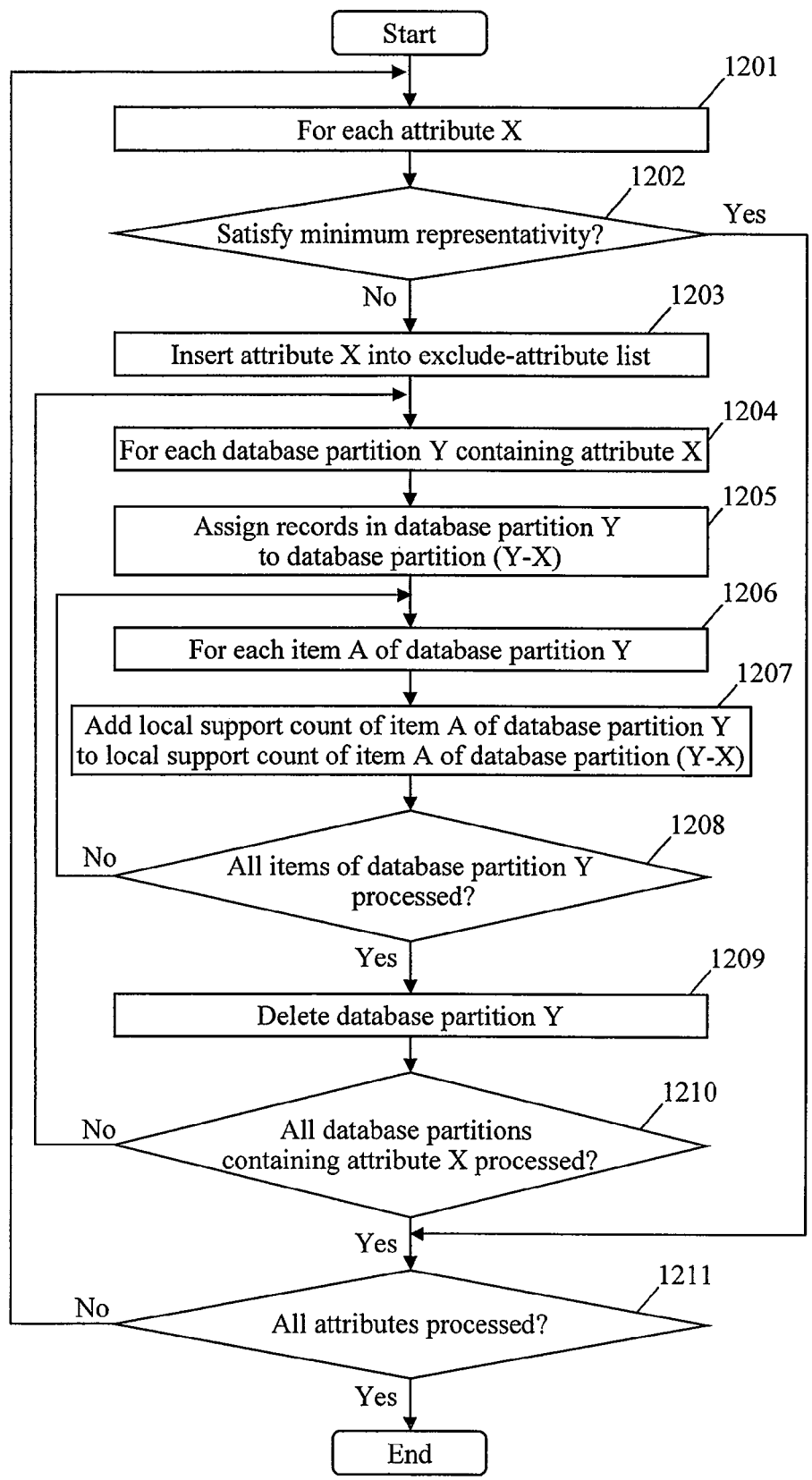
FIG. 12 is a flowchart showing the process of deleting the attribute for which the association rule extraction process has been completed in the present invention.

Next, the attribute that cannot satisfy the minimum representativity is detected, the above described attribute is inserted into the exclude-attribute list, each database partition is reconstructed, and the local support count of each item is updated. FIG. 12 is a flowchart describing the procedure for the process in detail. For each attribute, the value obtained by dividing the number of the records in which the above described attribute is not the missing value by the number of the records in the entire database is calculated, and if this value is less than the minimum representativity, since it is not necessary to extract the association rule including the above described attribute, the above described attribute is excluded from the analysis objects. The above described attribute is inserted into the exclude-attribute list (1203), and a list of the IDs of the records included in the database partition including the above described attribute is assigned to the database partition of the attribute list in which the above described attribute has been deleted from the attribute list of the above described database partition (1205). Furthermore, the local support count of each item in the database partition including the above described attribute is added to the local support count of the above described item in the database partition of the attribute list in which the above described attribute has been deleted from the attribute list of the above described database partition (1207). Finally, the database partition including the above described attribute is deleted (1209).

For example, it is assumed that the attribute X cannot satisfy the minimum representativity and the attribute list Y includes the attribute X. First, the attribute X is inserted into the exclude-attribute list, the attribute list (Y-X) in which the attribute X has been deleted from the attribute list Y is generated, and the IDs of the records included in the database partition of the attribute list Y are assigned to the database partition of the attribute list (Y-X). Next, for the item A belonging to the attribute list Y, if the local support count of the item A in the database partition of the attribute list Y is equal to or more than 1, the above described local support count is added to the local support count of the item A in the database partition of the attribute list (Y-X), and the count of the local support count of the item A in the attribute list Y is deleted. Finally, the database partition of the attribute list Y is deleted.

The subsequent process of extracting the item which does not simultaneously satisfy the minimum support and the minimum representativity and inserting the item into the exclude-item list, and for each item, the process of calculating the local support value in each database partition and retaining the local support value in the memory unit 901, and the process of sorting the attributes included in one or more database partitions in the arbitrary order are the same as the first embodiment.

Also in the second embodiment, the local frequent itemset extraction process 205, the global frequent itemset extraction process 206 and the association rule derivation process 207 are repeatedly performed for the specific attribute, according to this order of the attributes.

For the specific attribute, the local frequent itemset extraction process 205 counts the local support count of the itemset including the item belonging to the above described attribute, calculates the local support value of the above described itemset, and extracts the local frequent itemset, in all database partitions including the above described attribute. Here, the item for which the local support count of the itemset in each database partition is counted is an item which is not in the exclude-item list and is the local frequent item in the above described database partition, and in which the attribute to which the above described item belongs is not in the exclude-attribute list. The process of extracting the local frequent itemset in each database partition is the same as the first embodiment.

Next, the global frequent itemset extraction process 206 and the association rule derivation process 207 are performed.

Next, the attribute for which the association rule derivation process has been completed is deleted by the attribute deletion process.

Although the procedure for the attribute deletion process is the same as the flowchart shown in FIG. 8, the procedure is different in that the ID of the record is assigned in reconstructing the database partition (803), instead of the data of the record. For example, when the attribute for which the association rule derivation process has been completed is A, and the attribute list Z includes the attribute A, the attribute list (Z-A) in which the attribute A has been deleted from the attribute list Z is generated (802), and a list of the IDs of the records included in the database partition of the attribute list Z is assigned to the database partition of the attribute list (Z-A) (803). Furthermore, for each item included in the database partition of the attribute list Z, if the local support count of the above described item in the database partition of the attribute list Z is equal to or more than 1, the above described support count is added to the local support count of the above described item in the database partition of the attribute list (Z-A), and the local support value of the above described item in the database partition of the attribute list (Z-A) is recalculated (805). Finally, the database partition Z is deleted (809), the item belonging to the attribute A is inserted into the exclude-item list, and the attribute A is inserted into the exclude-attribute list (810).

When the local frequent itemset extraction process, the global frequent itemset extraction process and the association rule derivation process have been completed for all attributes, the process is completed.

The analysis method in the second embodiment has been described above. In this way, the information amount retained on the memory can be reduced to low by retaining the list of the IDs of the records, instead of the records, in the database partition, in the analysis process.

It should be noted that, in this embodiment, although, in the attribute deletion process (208), when the attribute for which the association rule derivation process has been completed is deleted, the database partition including the above described attribute has been deleted, it is also possible to similarly process the local frequent itemset extraction process (205), the global frequent itemset extraction process (206) and the association rule derivation process (207) by inserting the above described attribute into the exclude-attribute list and inserting the item belonging to the above described attribute into the exclude-item list, without deleting the database partition including the above described attribute, reconstructing each database partition, and updating the local support count and the local support value of each item in each database partition. The processing load can be reduced by performing only a process of updating the exclude-attribute list and the exclude-item list in the attribute deletion process (208). Furthermore, the processing load can also be reduced by retaining the itemset counted in the local frequent itemset extraction process (205), the global frequent itemset extraction process (206) and the association rule derivation process (207), along with the local support count of the above described itemset, in the memory unit 901, and preventing the process of counting the itemset for which the counting process has already been performed, in subsequent local frequent itemset extraction processes (205), subsequent global frequent itemset extraction processes (206) and subsequent association rule derivation processes (207).

EXAMPLE 4

The medical data shown in Table 1 is taken as an example, and the database partition generation process and the process of deleting the attribute for which the association rule extraction process has been completed will be described.

In the case of this example, for example, when the record with the patient ID of 2 has been read, the ID of the above described record is assigned to the database partition of {gene 2, disease name of ischemic heart disease, disease name of risk factor} which is the list of the attributes with no missing values. Furthermore, the counts of the number of the records of the attributes {gene 2}, {disease name of ischemic heart disease} and {disease name of risk factor} are increased by 1, and for the items {gene 2:AT}, {disease name of ischemic heart disease:myocardial infarction} and {disease name of risk factor:hypertension}, the counts of the global support count and the support count in the database partition {gene 2, disease name of ischemic heart disease, disease name of risk factor} are increased by 1. When the above described process has been completed for all records, database partitions shown in Table 13 are generated. Moreover, Table 3 shows the number of the records in which each attribute is not the missing value, Table 4 shows the global support count of each item, and Table 7 shows the local support count of each item in each database partition.

TABLE 13

| Database partition | Record ID list |
|---|---|
| {Gene 1, gene 2, disease name of ischemic heart disease, disease name of risk factor, family history of ischemic heart disease} | 1, 7, 14, 17, 20 |

TABLE 13-continued

| Database partition | Record ID list |
| --- | --- |
| {Gene 1, gene 2, disease name of ischemic heart disease, disease name of risk factor} | 9 |
| {Gene 2, disease name of ischemic heart disease, disease name of risk factor, family history of ischemic heart disease} | 4, 10 |
| {Gene 2, disease name of ischemic heart disease, disease name of risk factor} | 2, 3, 5, 12, 16, 18, 19 |
| {Gene 1, disease name of ischemic heart disease, disease name of risk factor} | 8, 13 |
| {Gene 1, disease name of risk factor} | 6, 11 |
| {Disease name of ischemic heart disease, disease name of risk factor} | 15 |

Next, the attribute that cannot satisfy the minimum representativity is deleted. In the case of this example, since the number of the records in which the attribute {family history of ischemic heart disease} is not the missing value is 7, the representativity of the above described attribute is calculated as 0.35, which cannot satisfy the minimum representativity, and therefore, the above described attribute is inserted into the exclude-attribute list and is excluded from the subsequent processes. For example, the IDs of the records included in the database partition {gene 1, gene 2, disease name of ischemic heart disease, disease name of risk factor, family history of ischemic heart disease} are assigned to the database partition {gene 1, gene 2, disease name of ischemic heart disease, disease name of risk factor}. Furthermore, the local support count of each item included in the database partition {gene 1, gene 2, disease name of ischemic heart disease, disease name of risk factor, family history of ischemic heart disease} is added to the database partition {gene 1, gene 2, disease name of ischemic heart disease, disease name of risk factor}. For example, the local support count of the item {gene 2:AA} in the database partition {gene 1, gene 2, disease name of ischemic heart disease, disease name of risk factor, family history of ischemic heart disease} is added to the database partition {gene 1, gene 2, disease name of ischemic heart disease, disease name of risk factor}, and the local support count of the item {gene 2:AA} in the database partition {gene 1, gene 2, disease name of ischemic heart disease, disease name of risk factor} becomes 3. Moreover, another database partition {gene 2, disease name of ischemic heart disease, disease name of risk factor, family history of ischemic heart disease} including the attribute {family history of ischemic heart disease} is also similarly processed, and thereby the database partitions become as shown in Table 14, and the local support count of each attribute in each database partition becomes as shown in Table 7.

TABLE 14

| Database partition | Record ID list |
| --- | --- |
| {Gene 1, gene 2, disease name of ischemic heart disease, disease name of risk factor} | 9, 1, 7, 14, 17, 20 |
| {Gene 2, disease name of ischemic heart disease, disease name of risk factor} | 2, 3, 5, 12, 16, 18, 19, 4, 10 |
| {Gene 1, disease name of ischemic heart disease, disease name of risk factor} | 8, 13 |
| {Gene 1, disease name of risk factor} | 6, 11 |
| {Disease name of ischemic heart disease, disease name of risk factor} | 15 |

The subsequent process of extracting the item which does not simultaneously satisfy the minimum support and the minimum representativity and inserting the item into the exclude-item list, and for each item, the process of calculating the local support value in each database partition and retaining the local support value in the memory unit, and the process of sorting the attributes included in one or more database partitions in the arbitrary order are the same as Example 2.

Next, the association rule extraction is performed. In this example, first, the association rule extraction is performed for the attribute {gene 2}. For the database partitions including the attribute {gene 2}, the itemset which becomes locally frequent in each database partition is extracted. The database partitions including the attribute {gene 2} are the database partition {gene 1, gene 2, disease name of ischemic heart disease, disease name of risk factor} and the database partition {gene 2, disease name of ischemic heart disease, disease name of risk factor}. For example, with respect to the database partition {gene 1, gene 2, disease name of ischemic heart disease, disease name of risk factor}, the records in the above described database partition are read from the data storage unit O, and for the seven items of {gene 1:CC}, {gene 1:CG}, {gene 2:AA}, {gene 2:TT}, {disease name of ischemic heart disease:angina pectoris}, {disease name of ischemic heart disease:none} and {disease name of risk factor:hypertension}, which are the local frequent items in the above described database partition, are not in the exclude-item list, and are the items in which the attributes to which the above described items belong are not in the exclude-attribute list, the itemsets including the item {gene 2:AA} or {gene 2:TT} are generated and the local support counts are counted. In each database partition, the local frequent itemsets shown in Table 9 are extracted.

The subsequent process of extracting the global frequent itemset from the local frequent itemset and the process of deriving the association rule from the extracted global frequent itemset are the same as Example 2.

Next, the process of deleting the attribute for which the association rule derivation process has been completed by the attribute deletion process will be described. In this example, since the association rule extraction process for the attribute {gene 2} has been completed, the above described attribute is excluded from each database partition. In this example, since the records have not been retained in the database partition, the above described attribute is excluded from the subsequent analysis process by inserting the above described attribute into the exclude-attribute list, instead of deleting the item belonging to the above described attribute from the records. Furthermore, the database partition is reconstructed, the local support count and the local support value of the item belonging to the above described database partition are updated, and the item belonging to the attribute {gene 2} is inserted into the exclude-item list. For example, a list of the IDs of the records in the database partition {gene 1, gene 2, disease name of ischemic heart disease, disease name of risk factor} is assigned to the database partition {gene 1, disease name of ischemic heart disease, disease name of risk factor}. Also the local support count of each item included in the database partition {gene 1, gene 2, disease name of ischemic heart disease, disease name of risk factor} is added to the local support count of the above described item in the database partition {gene 1, disease name of ischemic heart disease, disease name of risk factor}, and the local support count is updated. For example, for the item {disease name of risk factor:hypertension}, the local support count 4 in the database partition {gene 1, gene 2, disease name of ischemic heart disease, disease name of risk factor} is added to the local support count 2 in the database partition {gene 1, disease name of ischemic heart disease, disease name of risk factor}, and thereby the local support count is updated to 6 and the local support value is updated to 0.75 in the database partition {gene 1, disease name of ischemic heart disease, disease name of risk factor}. Database partitions generated by repeating the above described process for all database partitions including the attribute {gene 2} and each item included in the above described database partitions are shown in Table 15, the local support count and the local support value of each item are shown in Table 12, and the exclude-attribute list is shown in Table 16.

TABLE 15

| Database partition | Record ID list |
| --- | --- |
| {Gene 1, disease name of ischemic heart disease, disease name of risk factor} | 8, 13, 9, 1, 7, 14, 17, 20 |
| {Gene 1, disease name of risk factor} | 6, 11 |
| {Disease name of ischemic heart disease, disease name of risk factor} | 15, 2, 3, 5, 12, 16, 18, 19, 4, 10 |

TABLE 16

| Exclude-attribute list |
| --- |
| {Family history of ischemic heart disease, gene 2} |

According to the above described process, all association rules including the attribute {gene 2} have been extracted.

Next, all association rules can be extracted by repeating the local frequent itemset extraction process, the global frequent itemset extraction process and the association rule derivation process, for the second and subsequent attributes in the attribute order in order.

EXAMPLE 5

Figure 13:
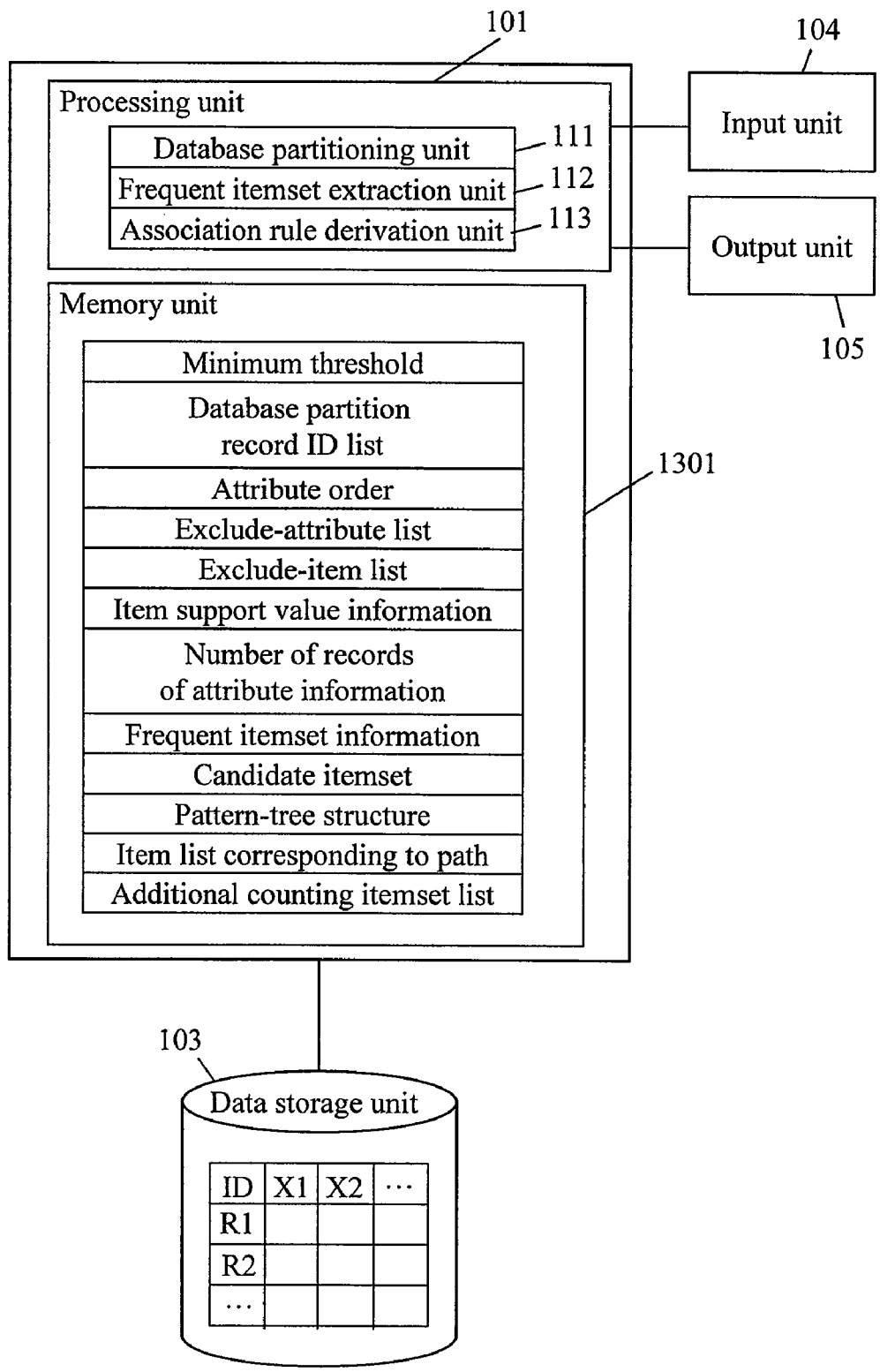
FIG. 13 is a diagram showing a system configuration example of a third embodiment of the present invention.

FIG. 13 is a diagram showing a system configuration example of a third embodiment of the present invention. This system is configured with the processing unit 101, a memory unit 1301 and the data storage unit 103. The processing unit and the memory unit consist of a computer, and the database to be analyzed is stored in the data storage unit. The minimum thresholds of the support value, the confidence value and the representativity, the database partition record ID list, an item order, the exclude-attribute list, the exclude-item list, the item support value information, the number of records of attribute information, the frequent itemset information, and a pattern-tree structure to be described later are retained in the memory unit 1301 as the data or the files.

Figure 14:
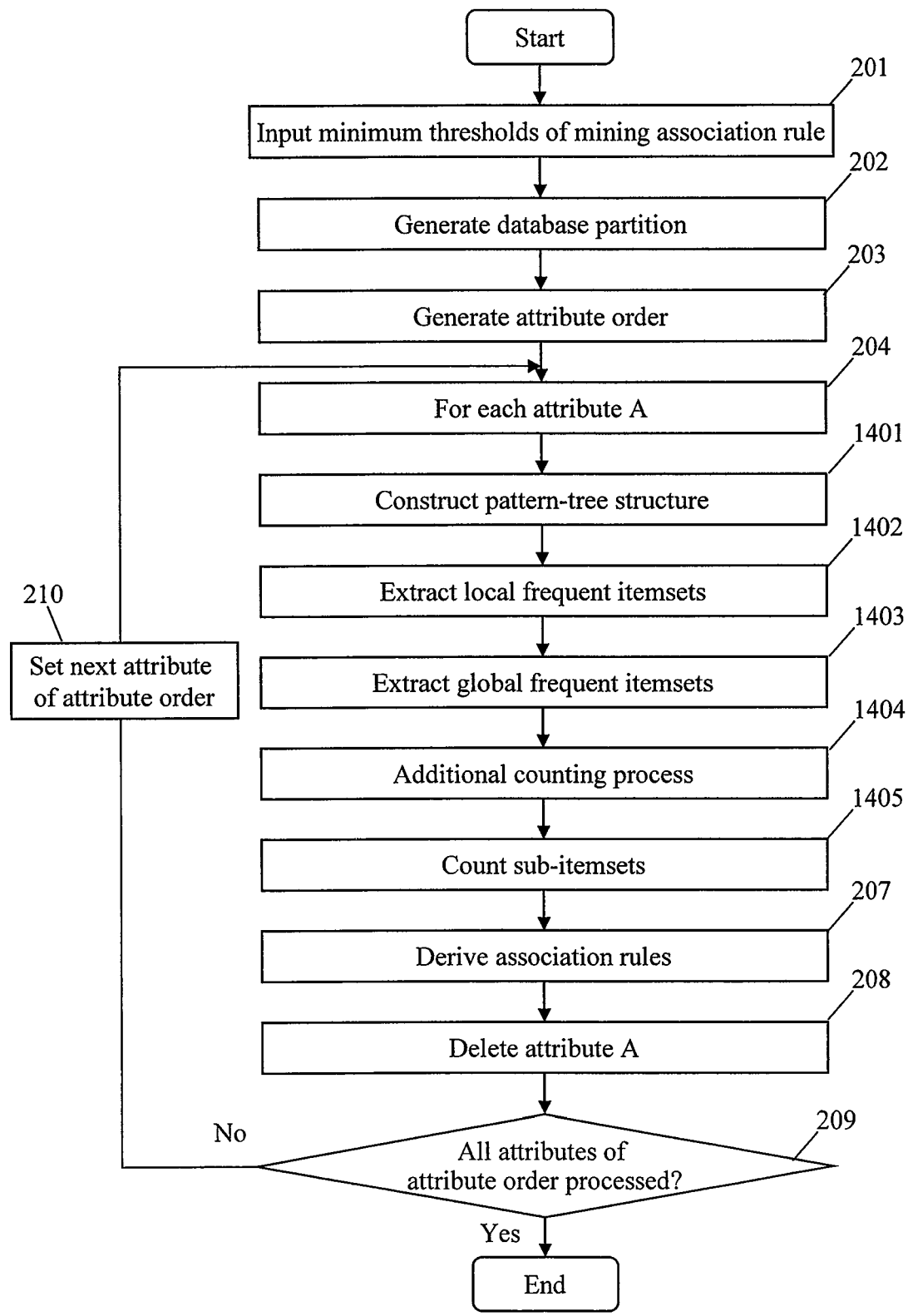
FIG. 14 is a flowchart showing the summary of the association rule extraction process in the present invention.

FIG. 14 is a flowchart describing the procedure for the data analysis in detail. First, the user obtains the minimum support, the minimum confidence and the minimum representativity of mining the association rule, from the input unit 104 (201), and stores them in the memory unit 1301. Then, the processing unit generates the database partitions with respect to the data stored in the connected data storage unit 103 (202), and generates the attribute order showing the order of the association rule extraction process (203). Subsequently, for a specific item, the pattern-tree structure to be described later is constructed (1401), the local frequent itemset in each database partition is extracted (1402), the global frequent itemset is extracted from the extracted local frequent itemset (1403), the itemset with the unknown local support count for which the counting process is required is counted (1404), a subitemset of the global frequent itemset with the unknown local support count is counted (1405), the association rule which satisfies the minimum support, the minimum confidence and the minimum representativity is derived (207), the extracted association rule is outputted to the output unit 105, and the above described attribute is excluded from the objects of the subsequent analyses (208).

Figure 15:
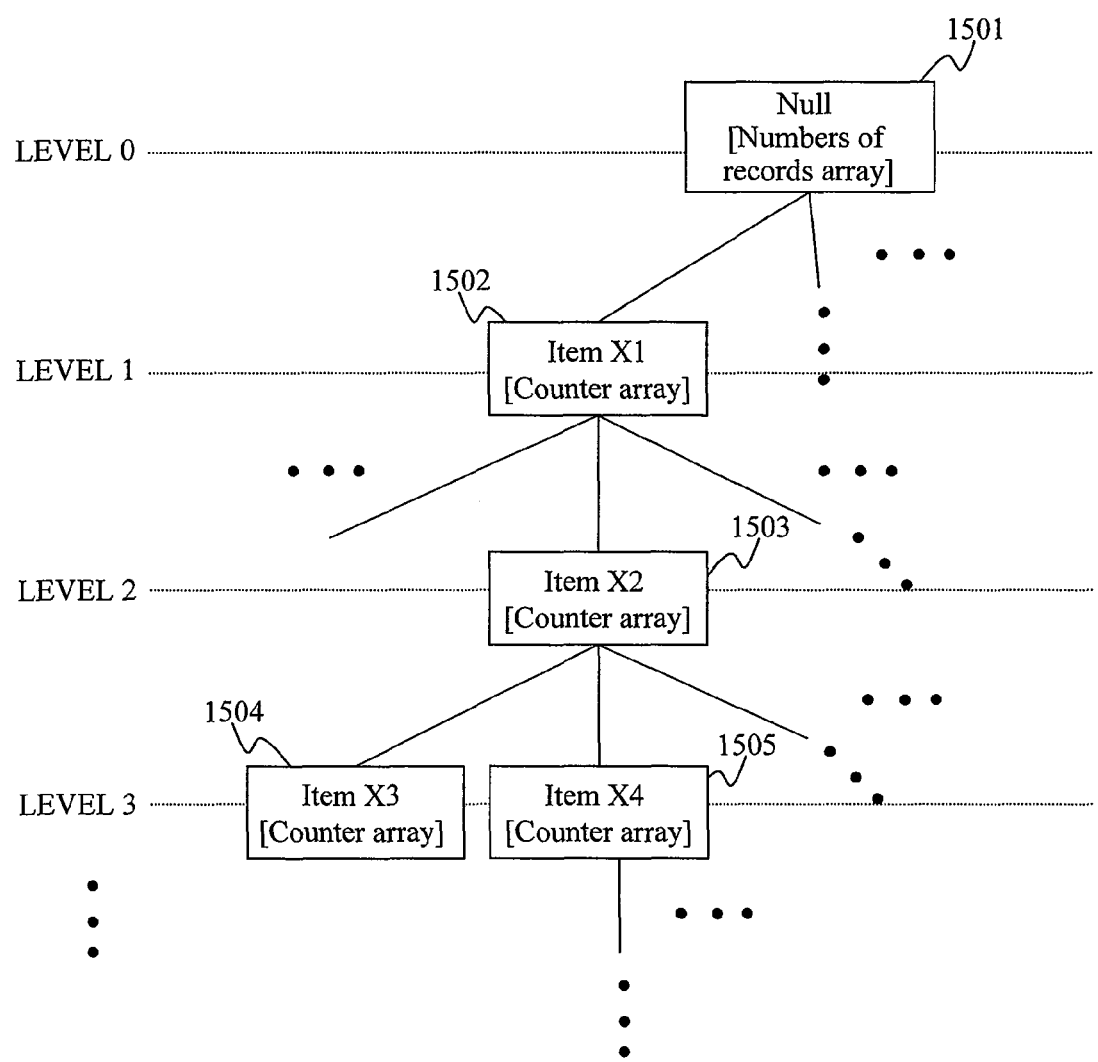
FIG. 15 is a schematic diagram showing a data structure used for counting a local support count.

An organized data structure shown in FIG. 15 is used for the process of counting the local support count of each itemset in the local frequent itemset extraction process 1402 of this embodiment. The above described organized data structure is referred to as "pattern-tree structure". The pattern-tree structure is a tree structure consisting of one or more nodes. Each node consists of a link to one parent node, links to zero or more child nodes, a label which is an item meant by the above described node, and a counter array for the item of the above described node for counting the number of records including the above described item in each database partition. Such a data structure includes a root 1501 at a zeroth depth, that is, Level 0 of data structure level. From here, the data structure branches into zero or more child nodes 1502 at Level 1, . . . . In a node at Level n, it is possible to transit to a node at Level (n−1) by following the link to one parent node linked to the above described node. Furthermore, it is possible to transit to a node at Level (n+1) by following the link to the child node linked to the above described node. For one node, if the link to the child node is zero, the above described node is referred to as "leaf node". For example, a node 1504 with a label of "item X3" is the leaf node. The counter array at one node shows, for a combination of the items of the labels of the nodes passed through while following the link to the parent node from the above described node and transiting to the root node, the number of records including the above described combination of the items in each database partition. For example, in the case of the pattern-tree structure shown in FIG. 15, since the nodes passed through while transiting from the leaf node 1504 of the item X3 at Level 3 to the root node 1501 are a node 1503 of an item X2 at Level 2 and the node 1502 of an item X1 at Level 1, the number of records of an itemset {X1, X2, X3} in each database partition becomes a value of the counter array of the above described node with the label of the item X3.

Figure 16:
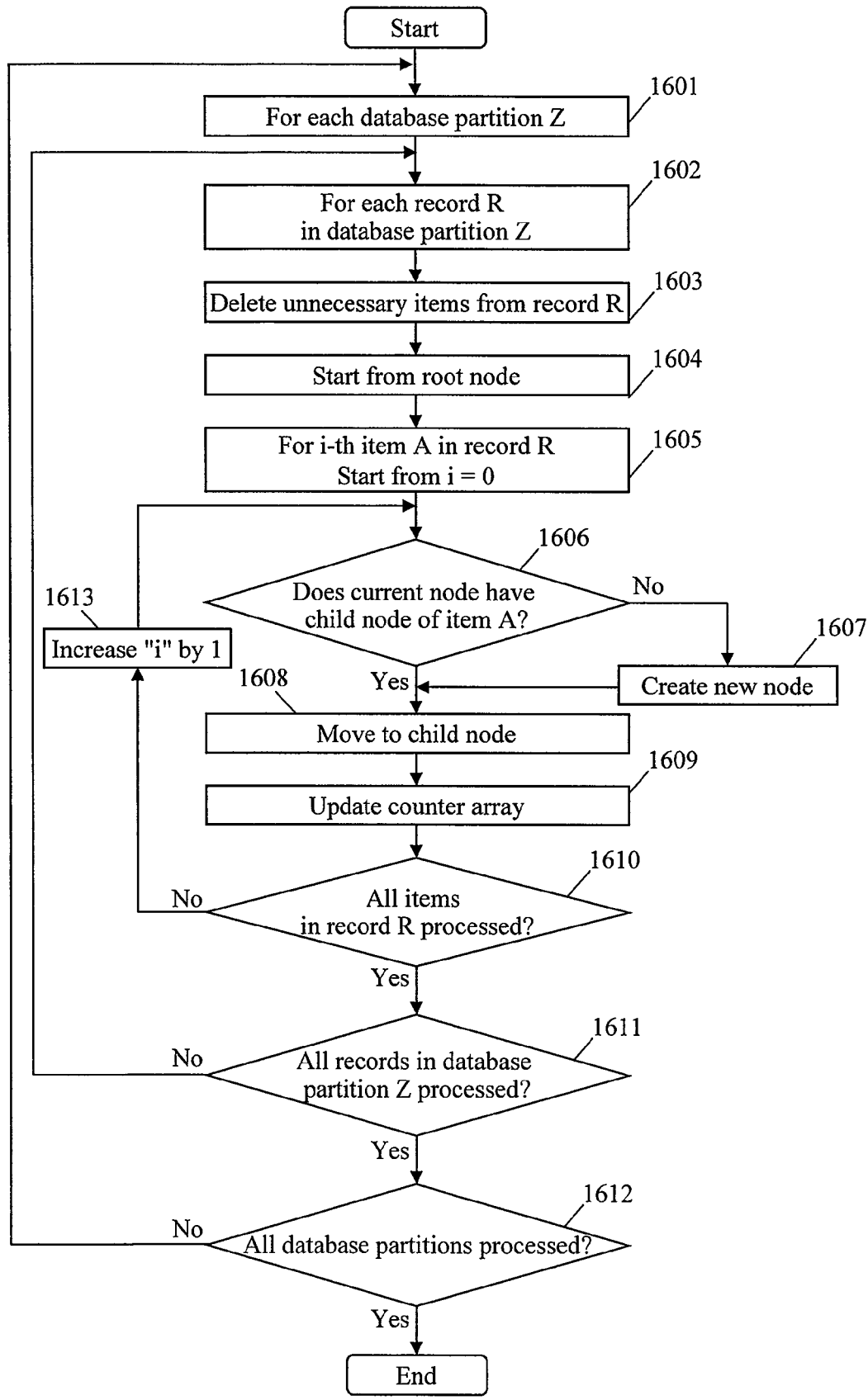
FIG. 16 is a flowchart showing a processing procedure for constructing the data structure.

FIG. 16 is a flowchart describing a procedure for constructing the pattern-tree structure in detail. It is assumed that a record R in a database partition Z has been read (1602). From items included in the record R, items belonging to an attribute which is not included in the exclude-attribute list, which are not included in the exclude-item list and are locally frequent in the database partition Z, are extracted, and an item column in which the above described items are sorted according to the attribute order is generated (1603). First, the process transits to the root node (1604). A counter corresponding to the database partition Z in the counter array of the root node is increased by 1 (1604). If there is no corresponding counter array, a counter array is newly added and a counter is set to 1. Next, the process transits to the child node of the root node. If there is no node with a label of a first item in the above described item column at a link destination of the child node of the root node, a node is newly created and provided with a link as the child node of the root node. The first item in the above described item column is set to a label of the above described node, a counter array of the above described node corresponding to the database partition Z is prepared, and a counter is set to zero (1607). The process transits to the node at the link destination of the root node (1608), and the counter corresponding to the database partition Z in the counter array of the above described node is increased by 1 (1609). If there is no corresponding counter array, a counter array is newly added, and a counter is set to 1. Subsequently, a process of transiting from a node P at Level i to a child node Q at Level (i+1) will be shown below. If there is a node with a label of an (i+1)th item from the top in the above described item column in child nodes of the node P, the process transits to the above described child node (1608). If there is no such a node, a new node with a label of the above described item and a counter corresponding to the above described database partition of 0 in a counter array is created and provided with a link as the child node of the node at Level i (1607), and subsequently, the process transits to the above described newly created child node (1608). In the node Q to which the process has transited, a count corresponding to the above described database partition in the counter array is increased by 1 (1609). If there is no corresponding counter array, a counter array is newly added and a counter is set to 1. Next, "i" is increased by 1 (1613), and the transition from the parent node to the child node is repeated until the last item in the above described item column.

The pattern-tree structure is used for counting the local support count of each itemset for the local frequent itemset extraction in each database partition. It is assumed that labels of nodes passed through while transiting from one leaf node with a label of an item X[m] at Level m to the root node by following the link to the parent node are items X[m−1], ..., X[1]. Here, a node at Level i in the above described passed nodes is X[i], and a set of the labels of the above described passed nodes is referred to as "path". If a counter corresponding to the database partition Z in a counter array retained in the above described node with the label of the item X[m] is C, the path shows that the local support count of an itemset {X[1], X[2], ..., X[m]} which is a combination of all items included in the path, in the database partition Z is C. Furthermore, for an itemset of a subset of the items included in the above described path, the above described path shows that the local support count of a portion included in the above described path is the local support count of the above described itemset. For example, for a portion of the itemset {X[1], X[m]} of the subset of the above described path, which is included in the path {X[1], X[2], ..., X[m]}, the local support count in the database partition Z becomes C. The local support count of the above described itemset in the entire database partition Z becomes a summation of the local support counts in the path including the above described itemset.

Figure 17:
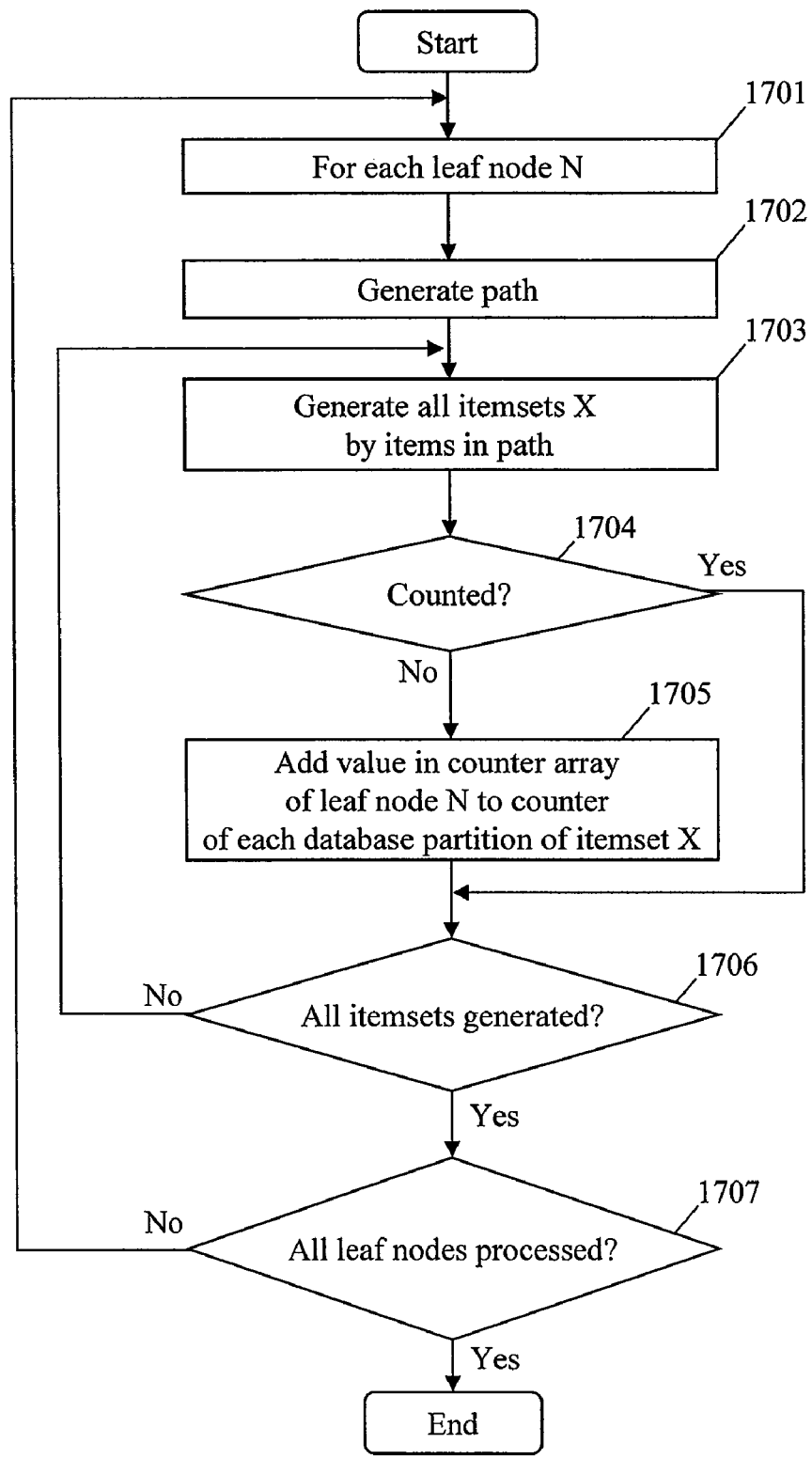
FIG. 17 is a flowchart showing a processing procedure for counting the local support count by using the data structure.

FIG. 17 is a flowchart describing a process of extracting the local support count of each itemset in each database partition in detail. For each leaf node, generating the path (1702), generating the itemset which can be generated from the path (1703), and adding the local support count of the above described itemset (1705) are repeated, and thereby the local support count of each itemset in each database partition is counted. For example, it is assumed that a path generated from a first leaf node is {A:a0, B:b1, C:c0}, a first counter in the counter array is 3 and a second counter is 5. Here, it is assumed that the first counter in the counter array is a database partition Z1, and the second counter is a database partition Z2. From the path {A:a0, B:b1, C:c0}, an itemset {A:a0, B:b1, C:c0}, an itemset {A:a0, B:b1}, an itemset {A:a0, C:c0}, an itemset {B:b1, C:c0}, an itemset {A:a0}, an itemset {B:b1} and an itemset {C:c0} are generated, counters of the local support counts of these itemsets in the database partition Z1 are set to 3, and counters of the local support counts in the database partition Z2 are set to 5. It is assumed that a path generated from a second leaf node is {A:a0, C:c0}, a node {A:a0} is common to the first leaf node, the first counter in the counter array is 4 and the second counter is 7. All itemsets which can be generated from the path {A:a0, C:c0} are generated, 4 is added to counters of the database partition Z1 of the above described itemsets, and 7 is added to counters of the database partition Z2. However, an itemset generated only with an item common to the path for which the counting has already been completed, among items included in the path, is not counted. For example, 7 is added to the counter of the database partition Z1 of the itemset {A:a0, C:c0}, while the addition is not performed in the second path, for the itemset {A:a0}. The local support count of each itemset in each database partition can be counted by performing the counting process with respect to all leaf nodes. A method of preventing the counting of the itemset generated only with the item common to the calculated path is processed by setting a calculated flag at each node passed through during the path generation, and distinguishing the items included in the path depending on states of the calculated flags (1704). Moreover, if the local frequent itemset including a specific attribute is extracted, the process is performed by limiting the itemsets generated from the path, to itemsets including an item belonging to the above described specific attribute.

Next, for the itemset which becomes locally frequent in one or more database partitions, the global support count of the above described itemset is obtained, the global support value is calculated, and the itemset is retained as the global frequent itemset in the memory unit 1301 if the itemset satisfies the minimum support (1403). Furthermore, a list of an itemset and a database partition which are required to be counted because the itemset has the unknown local support count but can become the global frequent itemset, is generated. The above described list is referred to as "additional counting itemset list".

Next, the local support count of the itemset registered in the additional counting itemset list is counted, and the global frequent itemset is extracted (1404). In each database partition, in the records included in the above described database partition, the item included in the itemset of the above described database partition included in the additional counting itemset list is added to the pattern-tree structure. When the process has been completed for all database partitions, a path from the added node or the node in which the counter array has been updated, to the root node is generated, and thereby the local support count of the itemset included in the additional counting itemset list is counted and the global frequent itemset is retained in the memory unit 1301.

Next, for each global frequent itemset retained in the memory unit 1301, the local support count of the itemset which is the sub-itemset of the above described global frequent itemset and has an unknown global support value is counted by following the nodes in the data structure, the global support value is calculated by Formula (1) and retained in the memory unit 1301 (1405).

Next, the association rule is derived from the global frequent itemset retained in the memory unit 1301 and outputted to the output unit 105.

The analysis method in the third embodiment has been described above. In this way, in the local frequent itemset extraction process, a processing load in database search can be reduced by constructing the pattern-tree structure from the database partitions and counting the local support count of each itemset in each database partition by using the pattern-tree structure.

It should be noted that, in the third embodiment as described above, although, in the construction of the pattern-tree structure, the pattern-tree structure has been constructed by limiting, from the items included in the records in each database partition, to the items belonging to the attribute which is not included in the exclude-attribute list, which are not included in the exclude-item list and are locally frequent in the above described database partition, it is also possible to similarly perform the process by constructing the pattern-tree structure including also the items which are not locally frequent, without limiting to the items which are locally frequent in the above described database partition.

Moreover, in the third embodiment, since the local support count of each itemset in each database partition is counted by using the pattern-tree structure, it is also possible to extract the global frequent itemset simultaneously with extracting the local frequent itemset.

EXAMPLE 6

The medical data shown in Table 1 is taken as an example, and processes of the pattern-tree structure construction 1401, the local frequent itemset extraction 1402, the global frequent itemset extraction 1403, the additional counting 1404, and the sub-itemset counting 1405 in the third embodiment will be described.

In this example, the pattern-tree structure construction process, the local frequent itemset extraction process, the global frequent itemset extraction process, the additional counting process, and the sub-itemset counting process for extracting the association rule including the attribute {gene 2} will be shown.

Figure 18:
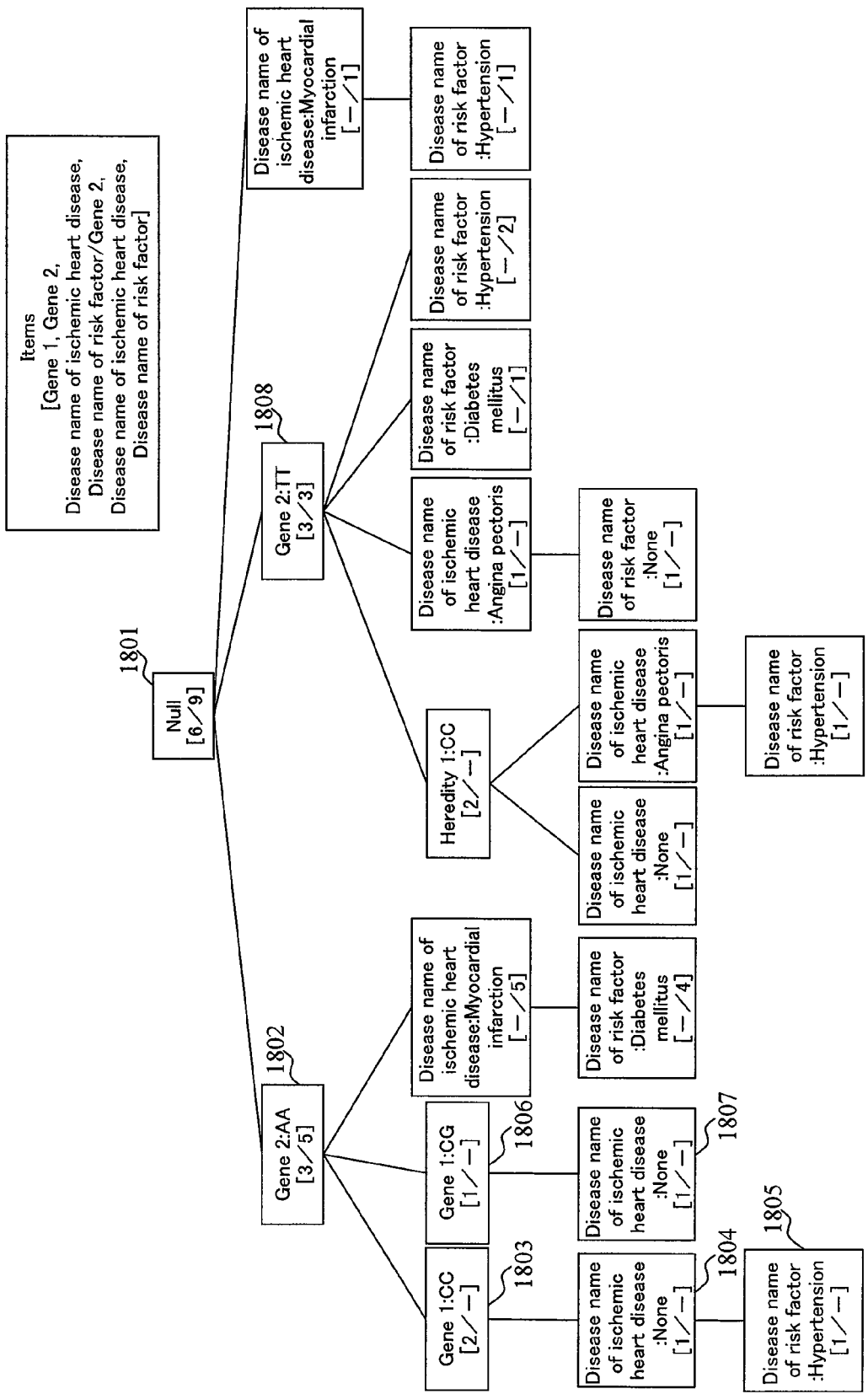
FIG. 18 is a diagram showing an example of the data structure in an example of the present invention.

In the pattern-tree construction process 1401, for the database partition including the attribute {gene 2}, the records are read and the pattern-tree is constructed. The pattern-tree structure constructed from the database partition including the attribute {gene 2} is shown in FIG. 18. In a counter array of each database partition of each node, a first counter is the database partition {gene 1, gene 2, disease name of ischemic heart disease, disease name of risk factor}, and a second counter is the database partition {gene 2, disease name of ischemic heart disease, disease name of risk factor}.

Next, an itemset including the attribute {gene 2} is generated by following the nodes in the pattern-tree structure, and the local support count of the above described itemset in each database partition is counted. In this example, for example, a path {gene 2:AA, gene 1:CC, disease name of ischemic heart disease:none, disease name of risk factor:hypertension} is generated by following a node 1804 with a label {disease name of ischemic heart disease:none}, a node 1803 with a label {gene 1:CC}, a node 1802 with a label {gene 2:AA}, and a root node 1801 from a leaf node 1805 with a label {disease name of risk factor:hypertension}, and the counted flags are set to these nodes. It can be seen that the support count in the database partition {gene 1, gene 2, disease name of ischemic heart disease, disease name of risk factor} of the leaf node 1805 with the label {disease name of risk factor: hypertension} is 1, and that the database partition {gene 2, disease name of ischemic heart disease, disease name of risk factor} is not included in the itemset generated from this path. In the counting of the itemset, an itemset which can be generated from the path {gene 2:AA, gene 1:CC, disease name of ischemic heart disease:none, disease name of risk factor: hypertension} and includes the attribute {gene 2} is generated, and a counter of the database partition {gene 1, gene 2, disease name of ischemic heart disease, disease name of risk factor} of the above described itemset is set to 1. Next, a path {gene 2:AA, gene 1:CG, disease name of ischemic heart disease:none} is generated by following a node 1807 with the label {disease name of ischemic heart disease:none}, a node 1806 with a label {gene 1:CG}, the node 1802 with the label {gene 2:AA}, and the root node 1801, and the counted flags are set to these nodes. An itemset which can be generated from the above described path and includes the attribute {gene 2} is generated, and 1 is added to a counter of the database partition {gene 1, gene 2, disease name of ischemic heart disease, disease name of risk factor} of the above described itemset. However, since the counted flag has been set to the item {gene 2:AA} in the above described path, the addition is not performed for the itemset of only the above described item. The local support count of each itemset in each database partition can be counted from the path generated by following the link to the parent node, from each leaf node to the root node. The local frequent itemset is extracted by calculating the local support value of each itemset in each database partition.

Next, the global frequent itemset is extracted from the extracted local frequent itemset, and the itemset for which the additional counting process is required is extracted. For example, although an itemset {gene 2:TT, disease name of ischemic heart disease:myocardial infarction} has not been counted in the database partition {gene 1, gene 2, disease name of ischemic heart disease, disease name of risk factor}, the local support count in the database partition {gene 2, disease name of ischemic heart disease, disease name of risk factor} is 5, and the upper threshold of the above described itemset calculated by Formula (2) becomes equal to or more than the minimum support. Since it is necessary to count the above described itemset in the database partition {gene 1, gene 2, disease name of ischemic heart disease, disease name of risk factor}, a pair of the above described itemset and the above described database item is retained in the additional counting itemset list.

When the extraction of the global frequent itemsets with respect to all local frequent itemsets and the itemset for which the additional counting process is required has been completed, the local support count of the itemset retained in the additional counting itemset list is counted. For example, since it has been registered that the counting of the local support count of the itemset {gene 2:TT, disease name of ischemic heart disease:myocardial infarction} in the database partition {gene 1, gene 2, disease name of ischemic heart disease, disease name of risk factor} is required, when the above described database partition has been read, the item {disease name of ischemic heart disease:myocardial infarction} is added to the pattern-tree structure. For the itemset retained in the additional counting itemset list, when the addition to the pattern-tree structure has been completed, the path is generated by following the parent node from the added node or the node in which the counter array has been updated, to the root node, the local support count of the itemset retained in the additional counting itemset list is counted, the global support value is calculated by Formula (1), and the itemset which satisfies the minimum support is retained as the global frequent itemset in the memory unit. Furthermore, the additional counting itemset list is emptied.

Next, for each global frequent itemset, if there is the itemset with the unknown global support value in sub-itemsets of the above described itemset, the above described itemset is retained in the additional counting itemset list. When extraction of the sub-itemset with the unknown global support value has been completed for all global frequent itemsets, the counting for the itemset retained from the pattern-tree structure into the additional counting itemset list is performed, and the global support value is calculated. Here, since data for counting the itemset retained in the additional counting itemset list has been retained in the pattern-tree structure which has already been constructed, the database search is not required.

Next, the association rule is derived from the global frequent itemset retained in the memory unit. Since the itemset for deriving the association rule including the attribute {gene 2} has been retained as the global frequent itemset, a database search process is not required.

As shown in this example, the global frequent itemset can be extracted by constructing the pattern-tree structure. The processing load in the database search can be reduced by performing the process of counting the local support count of the itemset by using the pattern-tree structure.

EXAMPLE 7

Another mode for performing the attribute deletion process (209) in the third embodiment of the present invention will be described.

When the process of deriving the association rule including the specific attribute has been completed, the process of deleting the above described attribute from each database partition has been performed. However, it is possible to insert the above described attribute into the exclude-attribute list, to insert the item belonging into the above described attribute into the exclude-item list, and to delete the node with the label of the item belonging to the above described attribute from the constructed pattern-tree structure, retain remaining nodes in the memory unit and reuse the remaining nodes at the time of the subsequent association rule extraction process.

In the attribute deletion process (209), for the attribute for which the association rule extraction process has been completed, after the insertion into the exclude-attribute list and the insertion into the exclude-item list, the node with the label of the item belonging to the above described attribute is deleted from the pattern-tree structure. For each node, the child nodes with the label of the same item are integrated. For the child nodes with the label of the same item, a summation of the values of the counter arrays of the above described nodes in each database partition is obtained, and the value of the counter array of one arbitrary node is replaced. Furthermore, a link of a child node of another node is provided to the above described node in which the value of the counter array has been replaced, and the above described another node is deleted from the pattern-tree. For all nodes, the child nodes with the item of the same label are integrated in order from the root node, and the constructed pattern-tree structure is retained in the memory unit.

In the association rule extraction process for the next attribute, in the case where it is necessary to construct the pattern-tree structure with respect to the database partition retained by the pattern-tree structure retained in the memory unit, if the database partition which has not been retained in the memory unit is required for the counting of the local support count in addition to the pattern-tree structure retained in the above described database partition memory unit from the pattern-tree structure retained in the memory unit, the pattern-tree structure is constructed by adding a new node to the pattern-tree structure retained in the above described memory unit, according to the pattern-tree structure construction process 1401 of the embodiment 3.

Another mode of the attribute deletion process in the third embodiment has been described above. A processing load in the pattern-tree structure construction can be reduced by removing an unnecessary node from the pattern-tree structure constructed in this way and retaining a remaining pattern-tree structure in the memory unit.

It should be noted that, in the above described embodiment, although the pattern-tree structure in which the unnecessary attribute has been removed from the constructed pattern-tree structure has been retained in the memory unit, the process can also be similarly performed by removing the unnecessary attribute and subsequently decomposing the pattern-tree structure for each database partition.

EXAMPLE 8

The medical data shown in Table 1 is taken as an example, and another embodiment of the attribute deletion process 208 in the third embodiment shown in Example 7 will be described.

Figure 19:
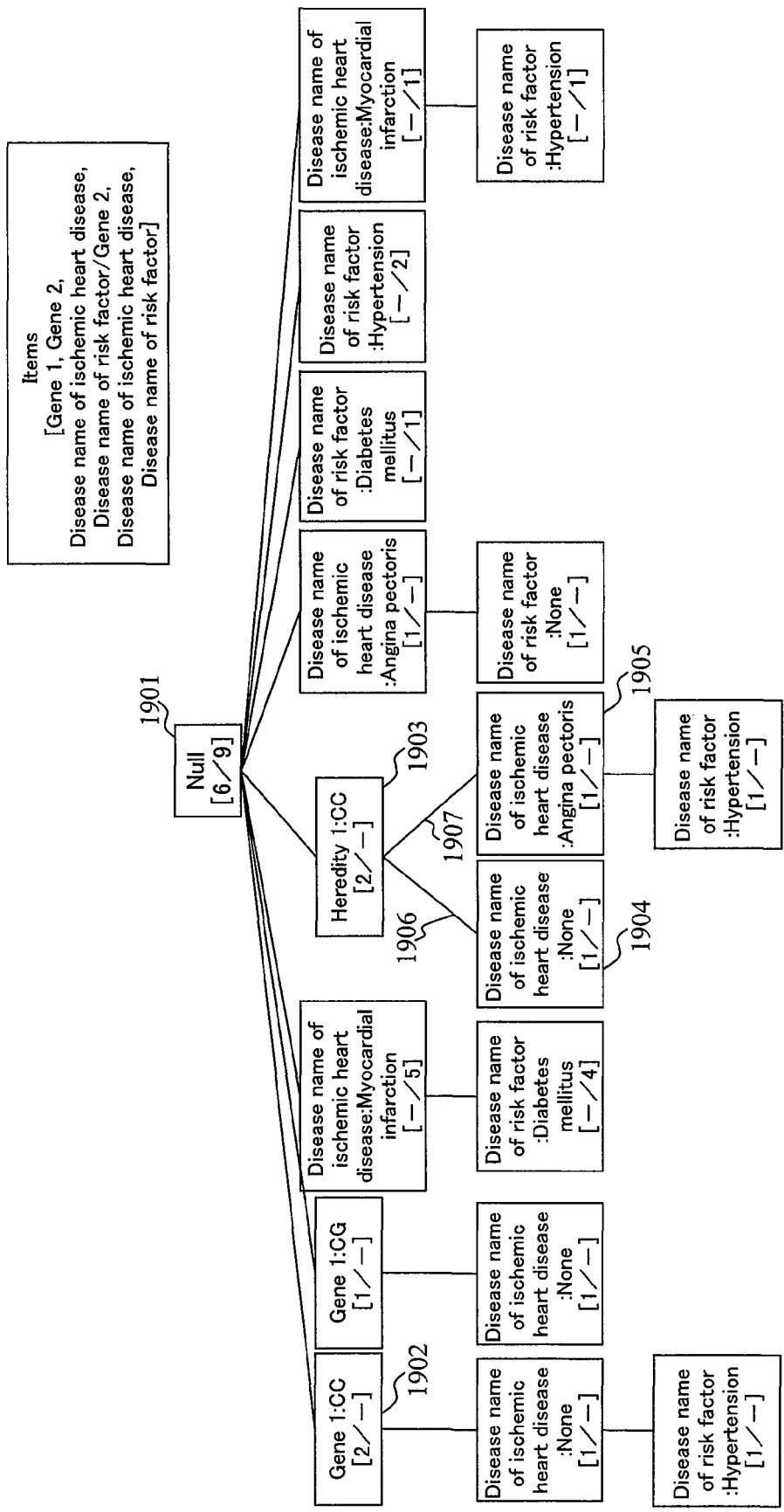
FIG. 19 is a diagram showing an example of the data structure in the example of the present invention.
Figure 20:
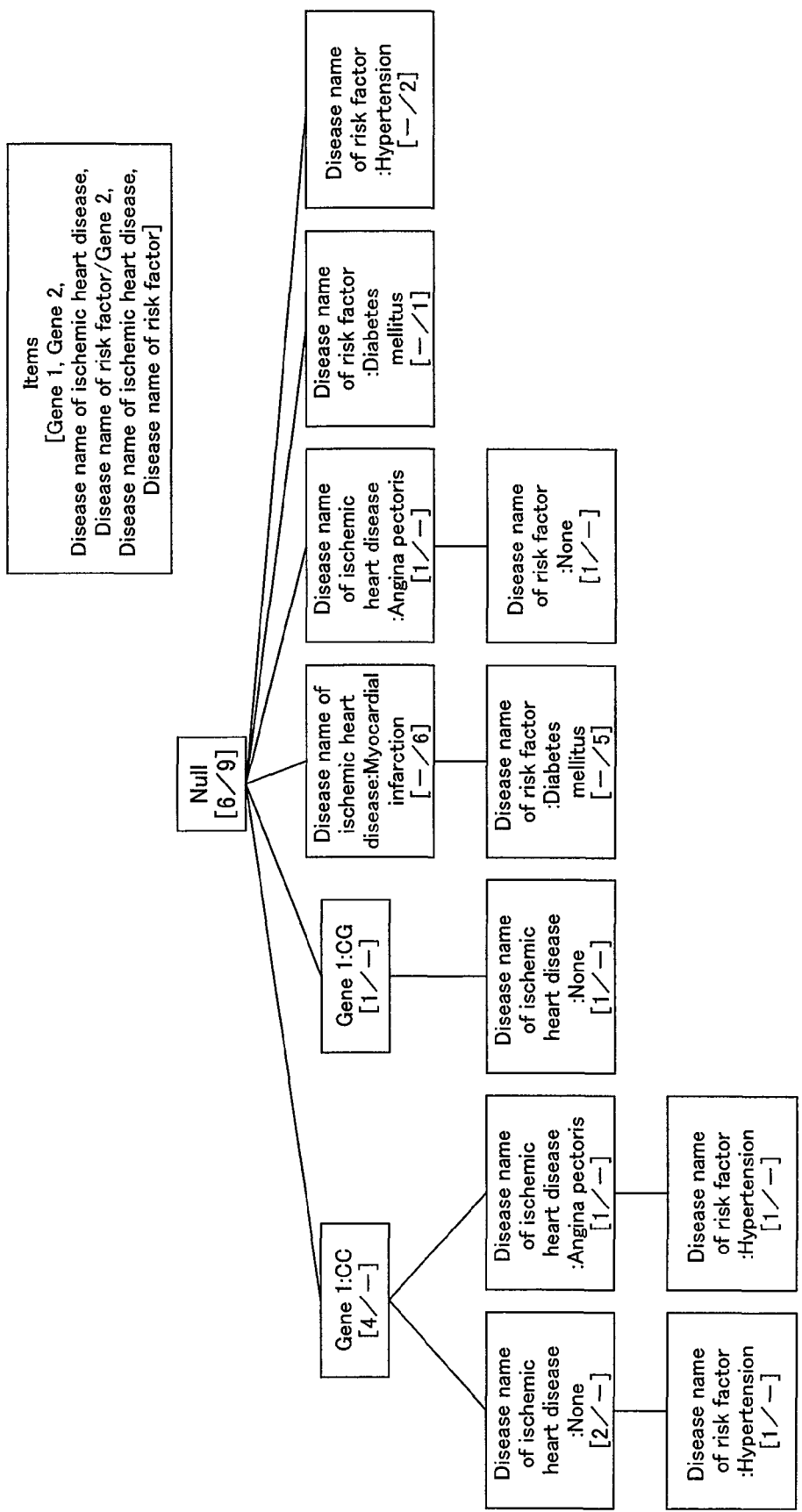
FIG. 20 is a diagram showing an example of the data structure in the example of the present invention.

In this example, it is assumed that the pattern-tree structure shown in FIG. 18 has been constructed when the association rule derivation process has been completed in the process of extracting the association rule including the attribute {gene 2}. A pattern-tree structure shown in FIG. 19 is constructed by deleting the nodes {gene 2:AA} 1802 and {gene 2:TT} 1808 with the label of the item belonging to the attribute {gene 2}. For a root node 1901, since a child node 1902 and a child node 103 of the above described root node have the same label {gene 1:CC}, they are integrated. A summation of counters of each database partition in counter arrays of the above described child nodes is obtained, and thereby a first counter is 4 and a second counter has no count. If the child node 1903 is integrated into the child node 1902, the first counter is set to 4 and the second counter is set to have no count in the counter array of the child node 1902, a link 1906 to a child node 1904 with a label of the item {disease name of ischemic heart disease:none} and a link 1907 to a child node 1905 with a label of the item {disease name of ischemic heart disease: angina pectoris} of the child node 1903 are added to a link of a child node of the child node 1902, and the child node 1903 is deleted. When the integration of all child nodes with the same label has been completed, a pattern-tree structure shown in FIG. 20 is constructed and retained in the memory unit. The above described pattern-tree structure can be reused when the database partition {gene 1, gene 2, disease name of ischemic heart disease, disease name of risk factor} and the database partition {gene 2, disease name of ischemic heart disease, disease name of risk factor} are subsequently required for the counting process.

As shown in this example, the processing load in the pattern-tree construction can be reduced by reusing the pattern-tree structure.

EXAMPLE 9

Figure 21:
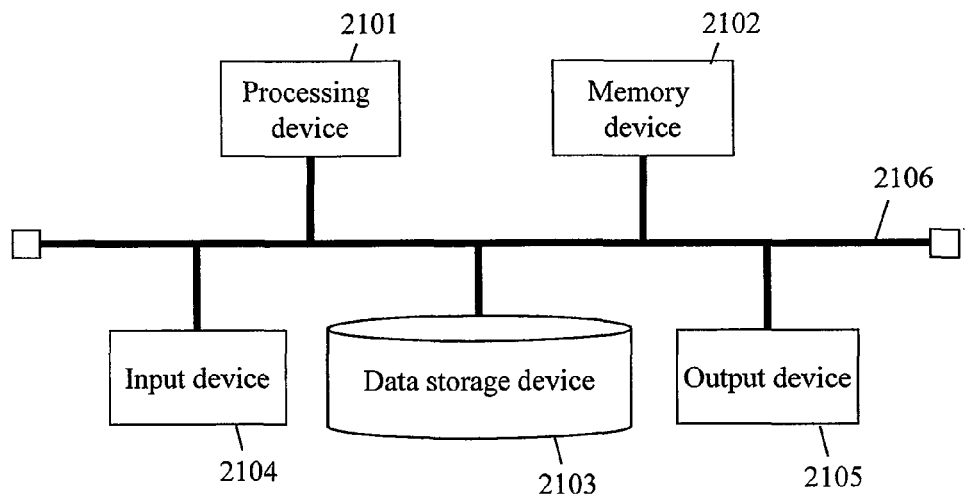
FIG. 21 is a diagram showing a system configuration example of a fourth embodiment of the present invention.

FIG. 21 is a diagram showing a system configuration example of a fourth embodiment of the present invention. In this system, a processing device 2101, a memory device 2102, a data storage device 2103, an input device 2104 and an output device 2105 are interconnected via a communication channel 2106 which is a bus or a network. Processes of the respective devices are the same as the first, second and third embodiments. The processing device 2101 performs the process of the processing unit 101, the memory device 2102 performs the process of the memory unit 102, the data storage device 2103 performs the process of the data storage unit 103, the input device 2104 performs the process of the input unit 104, the output device 2105 performs the process of the output unit 105, and thereby the association rule can be extracted from the data including the missing.

EXAMPLE 10

Figure 22:
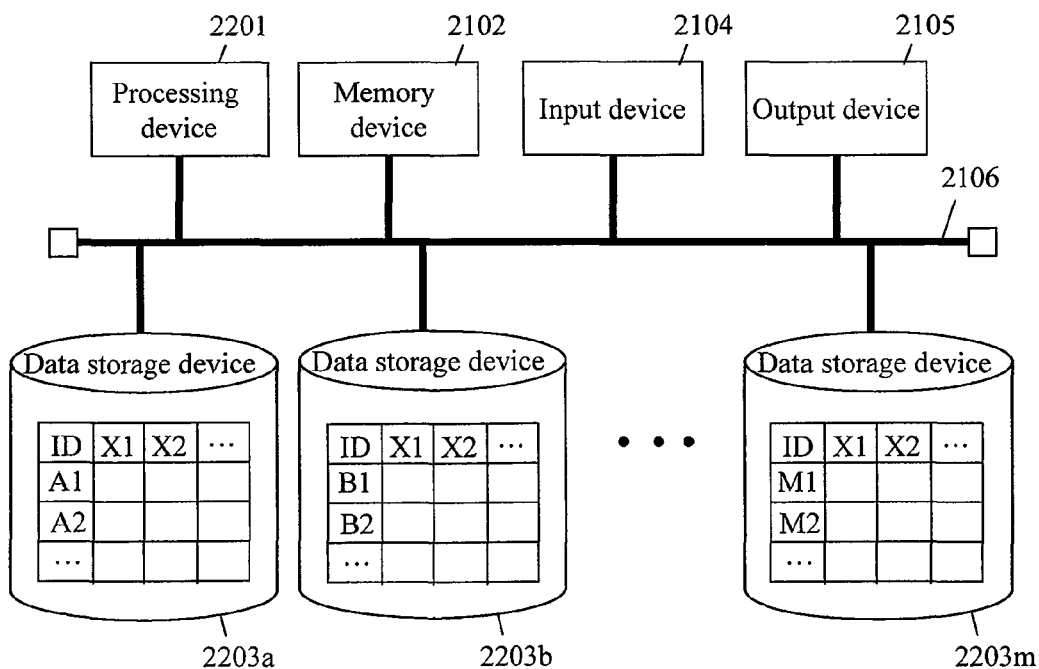
FIG. 22 is a diagram showing a system configuration example of a fifth embodiment of the present invention.

FIG. 22 is a diagram showing a system configuration example of a fifth embodiment of the present invention. In this system, a processing device 2201, the memory device 2102, the input device 2104, the output device 2105, and multiple data storage devices 2203a, 2203b, . . . , 2203m (m is an integer equal to or more than 2) are interconnected via the communication channel 2106 which is the bus or the network. In each data storage device, a database in which the attributes are the same or duplicated among two or more data storage devices, and records in which IDs duplicated among two or more data storage devices do not exist are retained.

The processes of the memory device 2102, the input device 2104 and the output device 2105 are the same as the fourth embodiment. The processing device 2201 reads the records from the respective data storage devices 2203a to 2203m, and thereby the association rule can be extracted from the data including the missing by the same process as the fourth mode.

EXAMPLE 11

Figure 23:
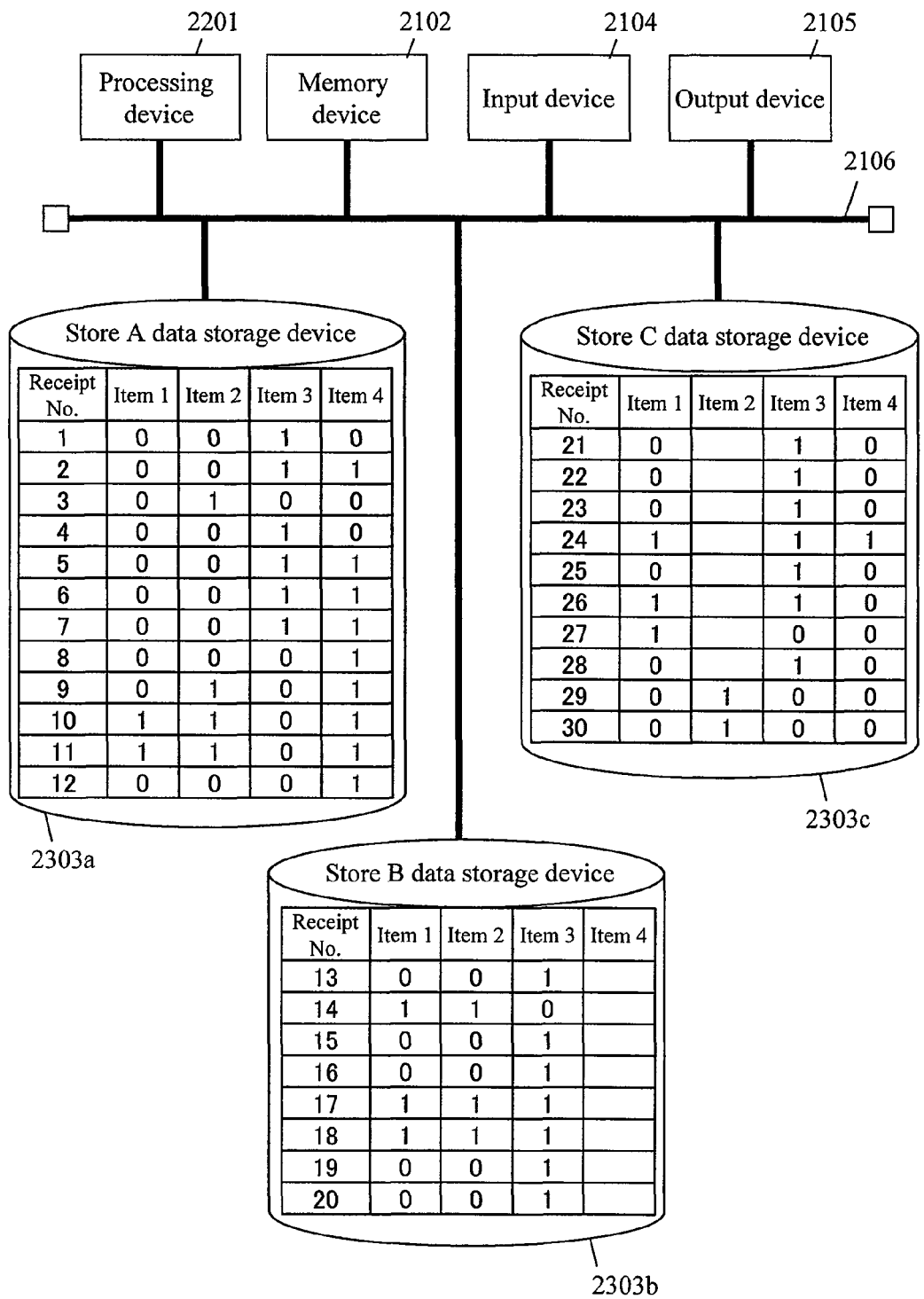
FIG. 23 is a diagram showing an example of a database to be analyzed in an example of the present invention.

Basket data in a retail industry shown in FIG. 23 is taken as an example, and a process of the fifth embodiment will be described.

The database to be analyzed is the set of the records consisting of the multiple attributes. When the basket data in the retail industry is taken as an example, one record is a list of items purchased by one customer, and the respective attributes are information on an item to be sold such as an item name and an item classification, or information on characteristics of the customer who has purchased, such as sex and age group.

In this example, it is assumed that basket data in three stores of a store A, a store B and a store C is retained in three independent data storage devices 2303a, 2303b and 2303c connected via the communication channel. The example of FIG. 23 consists of four attributes of item 1, item 2, item 3 and item 4, and an attribute value of each attribute is binary of 1 and 0. The attribute value of 1 shows that the customer has purchased the item with the attribute of the above described attribute value, and the attribute value of 0 shows that the customer has not purchased the item. The number of all records is 30, record IDs 1 to 12 have been stored in a database of the store A, record IDs 13 to 20 have been stored in a database of the store B, and record IDs 21 to 30 have been stored in a data storage unit of the store C. Since the store A sells all items, the missing value is not included. However, the store B does not sell item 4, item 4 is the missing value in all records in the database of the store B. Since the store C has not sold item 2 until some point, item 2 is the missing value in some records.

In the input device 2104, the case where the minimum threshold of the support value of 0.20, the minimum threshold of the confidence value of 0.75 and the minimum threshold of the representativity of 0.2 have been inputted by the user will be considered.

The processing device 2201 reads the records from the data storage devices 2303a, 2303b and 2303c, and thereby generates database partitions shown in Table 17 and retains the database partitions in the memory device 2102. The subsequent process can be processed in a similar manner to the first embodiment by reading the data from the memory device 2102 and outputting the extracted association rule to the output device 2105, in the processing device 2201.

TABLE 17

| Database partition {item 1, item 2, item 3, item 4} | | | | |
|---|---|---|---|---|
| Receipt No. | Item 1 | Item 2 | Item 3 | Item 4 |
| 1 | 0 | 0 | 1 | 0 |
| 2 | 0 | 0 | 1 | 1 |
| 3 | 0 | 1 | 0 | 0 |

TABLE 17-continued

| | | | | |
|---|---|---|---|---|
| 4 | 0 | 0 | 1 | 0 |
| 5 | 0 | 0 | 1 | 1 |
| 6 | 0 | 0 | 1 | 1 |
| 7 | 0 | 0 | 1 | 1 |
| 8 | 0 | 0 | 0 | 1 |
| 9 | 0 | 1 | 0 | 1 |
| 10 | 1 | 1 | 0 | 1 |
| 11 | 1 | 1 | 0 | 1 |
| 12 | 0 | 0 | 0 | 1 |
| 29 | 0 | 1 | 0 | 0 |
| 30 | 0 | 1 | 0 | 0 |

| Database partition {item 1, item 2, item 3} | | | |
|---|---|---|---|
| Receipt No. | Item 1 | Item 2 | Item 3 |
| 13 | 0 | 0 | 1 |
| 14 | 1 | 1 | 0 |
| 15 | 0 | 0 | 1 |
| 16 | 0 | 0 | 1 |
| 17 | 1 | 1 | 1 |
| 18 | 1 | 1 | 1 |
| 19 | 0 | 0 | 1 |
| 20 | 0 | 0 | 1 |

| Database partition {item 1, item 3, item 4} | | | |
|---|---|---|---|
| Receipt No. | Item 1 | Item 3 | Item 4 |
| 21 | 0 | 1 | 0 |
| 22 | 0 | 1 | 0 |
| 23 | 0 | 1 | 0 |
| 24 | 1 | 1 | 1 |
| 25 | 0 | 1 | 0 |
| 26 | 1 | 1 | 0 |
| 27 | 1 | 0 | 0 |
| 28 | 0 | 1 | 0 |

In the case of this example, for example, an association rule {item 1:1} ⇒ {item 2:1} (the confidence value=1.00, the support value=0.23 and the representativity=0.67) is extracted. The above described association rule means that a customer who has purchased item 1 has also always purchased item 2. Furthermore, in the case of this example, an association rule {item 1:0, item 2:0} ⇒ {item 4:1} (the confidence value=0.75, the support value=0.43 and the representativity=0.40) is extracted. The above described association rule means that three fourths of customers who have not purchased item 1 and item 2 together have purchased item 4. Such association rules can help in making policy of sales such as arrangement of the items.

It should be noted that, of course, the application range of the present invention is not limited to medical cares or the retail industry, and the present invention is applicable to fields in which the database is broadly used in operations management.

INDUSTRIAL APPLICABILITY

The present invention is applicable to software and services which have the data including the missing as the analysis objects and analyze relevance among the data. The present invention can also be added to an association rule mining function of general-purpose data mining software or statistics analysis software.

The invention claimed is:
1. A method of, when a pair of an attribute and an attribute value in a database are an item, a combination of items are an itemset and an association rule is composed of an antecedent and a consequent, each of which is an itemset, extracting an association rule holding true among two or more items in which the attribute value is not missing, from a database consisting of records in which zero or more attribute values are missing, comprising:
- a first step of partitioning the database into record units in which the same attribute is a missing value;
- a second step of counting a support count, which is the number of records in which an itemset including a specific attribute is included, in the record units;
- a third step of, based on the support count, for all itemsets of the entire database calculating the number of records which include the itemset;
- a fourth step of generating an association rule in which an antecedent is a sub-itemset of one of the itemsets and a consequent is a remaining itemset of said one of the itemsets excluding said sub-itemset; and
- a fifth step of excluding said specific attribute from analysis objects.

2. The association rule extraction method according to claim 1, wherein:
- for said association rule, an association rule is extracted, the association rule satisfying:
- a minimum support which is a specified minimum threshold of a support value which is a ratio of the records including the itemset constituting the association rule to records in which the attribute in the itemset is not missing, in said database;
- a minimum confidence which is a specified minimum threshold of a confidence value which is a ratio of records which also simultaneously include the itemset of the consequent of the association rule, in records including the itemset of the antecedent of the association rule; and
- a minimum representativity which is a specified minimum threshold of a representativity which is a ratio of records in which an attribute included in the itemset of the antecedent or the consequent of the association rule is not the missing value, to all records in said database.

3. The association rule extraction method according to claim 2, wherein:
- at said second step, a local frequent itemset which is an itemset equal to or more than the specified minimum support is extracted in each partitioned database; and
- at said third step, the support count in said entire database is counted only for said local frequent itemset, and the support value is calculated.

4. The association rule extraction method according to claim 2, wherein said third step further includes:
- a step of calculating an upper threshold of the support count of an itemset with an unknown support count, from a known support count of the itemset in said partitioned database and a known support count of an itemset which is the sub-itemset of the itemset, in the partitioned database in which all attributes included in the itemset are not the missing values, other than said partitioned database;
- a step of calculating an upper threshold of the support value from said calculated upper threshold of the support count; and
- a step of excluding an itemset in which said calculated upper threshold of the support value is less than said minimum support, from the itemset counted at said third step.

5. The association rule extraction method according to claim 4, wherein:
- for said partitioned databases in which an attribute included in an itemset X is not the missing value, when:
- the number of said partitioned databases is m (m is an integer equal to or more than 1);
- said partitioned databases in which a local support count of the itemset X is known are DB(1), ..., DB(n) (n is an integer equal to or more than 1);
- said partitioned databases in which the local support count of the itemset X is unknown are DB(n+1), ..., DB(m);
- the number of the records in the partitioned database is RC(DB(i));
- the local support count of the itemset X in a partitioned database DB(i) is LS(X:DB(i)); and
- a sub-itemset of the itemset X is X',
- an upper threshold U(X) of the support value of the itemset X in the entire database is calculated by a following formula $$U(X) = \frac{\sum_{i=1}^{n} LS(X:DB(i)) + \sum_{j=n+1}^{m} \min\{LS(X':DB(j)) \mid X' \subseteq X\}}{\sum_{k=1}^{m} RC(DB(k))}.$$

* * * * *